(12) United States Patent
Sakai et al.

(10) Patent No.: US 8,352,681 B2
(45) Date of Patent: Jan. 8, 2013

(54) STORAGE SYSTEM AND A CONTROL METHOD FOR ACCELERATING THE SPEED OF COPY PROCESSING

(75) Inventors: Kosuke Sakai, Isehara (JP); Koji Nagata, Kaisei (JP); Yoshiyuki Noborikawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 12/665,285

(22) PCT Filed: Jul. 17, 2009

(86) PCT No.: PCT/JP2009/063311
§ 371 (c)(1),
(2), (4) Date: Dec. 17, 2009

(87) PCT Pub. No.: WO2011/007459
PCT Pub. Date: Jan. 20, 2011

(65) Prior Publication Data
US 2011/0191554 A1    Aug. 4, 2011

(51) Int. Cl.
*G06F 13/00* (2006.01)
(52) U.S. Cl. .............................. 711/120; 711/E12.026
(58) Field of Classification Search .................. None
See application file for complete search history.

(56) References Cited

U.S. PATENT DOCUMENTS

| 5,263,154 A | 11/1993 | Eastridge |
| 5,761,531 A | 6/1998 | Ohmura |
| 7,721,056 B2 * | 5/2010 | Wake ............................ 711/162 |
| 2001/0000818 A1 | 5/2001 | Nagasawa |
| 2002/0144070 A1 | 10/2002 | Watanabe |
| 2003/0028737 A1 * | 2/2003 | Kaiya et al. .................... 711/162 |
| 2004/0260898 A1 | 12/2004 | Stanley |
| 2005/0198452 A1 * | 9/2005 | Watanabe ...................... 711/162 |
| 2006/0129773 A1 | 6/2006 | Watanabe |
| 2008/0320260 A1 * | 12/2008 | Watanabe ...................... 711/162 |

FOREIGN PATENT DOCUMENTS

| JP | 6-259198 | 9/1994 |
| JP | 11-184641 | 7/1999 |

* cited by examiner

*Primary Examiner* — Edward Dudek, Jr.
*Assistant Examiner* — Sean D Rossiter
(74) *Attorney, Agent, or Firm* — Brundidge & Stanger, P.C.

(57) ABSTRACT

Proposed are a highly reliable storage system and its control method capable of accelerating the processing speed of the copy processing seen from the host device.

With the storage system and its control method which stores a command issued from a host device in a command queue and executes the command stored in the command queue in the order that the command was stored in command queue, a copy queue is set for temporarily retaining a copy command among the commands issued from the host device in the memory, the copy command among the commands is moved from the host device stored in the command queue to the copy queue and an execution completion reply of copy processing according to the command is sent to the host device as a sender of the command, and the copy command that was moved to the copy queue is executed in the background in the order that the copy command was stored in the copy queue.

12 Claims, 28 Drawing Sheets

| # | I/O TYPE | I/O DESTINATION | COPY SOURCE | COPY DESTINATION (WITH OVERLAPPING) | COPY DESTINATION (WITHOUT OVERLAPPING) |
|---|---|---|---|---|---|
| 1 | READ | NOT YET COPIED | [1] NORMAL READ | [2] COPY DATA FROM COPY SOURCE OF FAST 2 AND THEN READ(DIFFERENCE BIT: OFF IN BOTH FAST 1 AND FAST 2) | [3] COPY DATA FROM COPY SOURCE AND THEN READ(DIFFERENCE BIT: ON TO OFF) |
| 2 | | ALREADY COPIED | SAME AS [1] | SAME AS [1] | SAME AS [1] |
| 3 | WRITE | NOT YET COPIED | [4] SAVE IN COPY DESTINATION AND WRITE (DIFFERENCE BIT: ON TO OFF) | [5] COPY DATA FROM COPY SOURCE OF FAST 2 AND THEN WRITE(DIFFERENCE BIT: OFF IN BOTH FAST 1 AND FAST 2) | [6] COPY DATA FROM COPY SOURCE AND THEN WRITE(DIFFERENCE BIT: ON TO OFF) |
| 4 | | ALREADY COPIED | [7] NORMAL WRITE | SAME AS [7] | SAME AS [7] |

FIG.3

| ID | COPY SOURCE 31B | | | COPY SOURCE 31C | | | STATUS |
|---|---|---|---|---|---|---|---|
| | LUN | STARTING ADDRESS | ENDING ADDRESS | LUN | STARTING ADDRESS | ENDING ADDRESS | |
| 1 | 0 | x'100000' | x'200000' | 1 | x'500000' | x'600000' | IN COPY |
| 2 | 1 | x'1000000' | x'1001000' | 0 | x'800000' | x'801000' | IN COPY |
| 3 | 2 | x'320000' | x'360000' | 2 | x'880000' | x'9C0000' | INITIAL STATUS |
| 4 | 2 | x'7600000' | x'7700000' | 3 | x'0' | x'100000' | INITIAL STATUS |
| 5 | 2 | x'7510000' | x'7610000' | 3 | x'300000' | x'400000' | INITIAL STATUS |

FIG.4

| # | STATUS | DESCRIPTION |
|---|---|---|
| 1 | INITIAL STATUS | THE STATUS AT THE TIME OF BEING REGISTERED IN THE COPY QUEUE AND THE STATUS IN WHICH BACKGROUND COPY IS NOT YET PERFORMED. |
| 2 | BACKGROUND COPY STATUS | SHOWS THE STATUS IN WHICH THE COPY IS BEING PERFORMED IN THE BACKGROUND. THE STATUS IS RETURNED WHEN TRANSITING FROM THE INITIAL STATUS TO THE BACKGROUND COPY STATUS, AND THE BACKGROUND COPY IS STARTED. AFTER COMPLETING THE BACKGROUND COPY, THE ENTRY IS DELETED FROM THE COPY QUEUE. |
| 3 | ERROR STATUS | THE STATUS IN WHICH A FAILURE OCCURS AND THE COPY CANNOT BE PERFORMED. |
| 4 | BUSY STATUS | THE STATUS IN WHICH THE COPY CANNOT BE PERFORMED FOR THE TARGET AREA DUE TO OTHER PROCESSING. |

FIG.7

| # | I/O TYPE | I/O DESTINATION | COPY SOURCE | COPY DESTINATION |
|---|---|---|---|---|
| 1 | READ | NOT YET COPIED | [1] NORMAL READ | [2] COPY DATA FROM COPY SOURCE AND THEN READ (DIFFERENCE BIT: ON TO OFF) |
| 2 |  | ALREADY COPIED | SAME AS [1] | SAME AS [1] |
| 3 | WRITE | NOT YET COPIED | [3] SAVE IN COPY DESTINATION AND WRITE (DIFFERENCE BIT: ON TO OFF) | [4] COPY DATA FROM COPY SOURCE AND THEN WRITE (DIFFERENCE BIT: ON TO OFF) |
| 4 |  | ALREADY COPIED | [5] NORMAL WRITE | SAME AS [5] |

FIG.12

| # | I/O TYPE | I/O DESTINATION | COPY SOURCE (WITH OVERLAPPING) | COPY SOURCE (WITHOUT OVERLAPPING) | COPY DESTINATION |
|---|---|---|---|---|---|
| 1 | READ | NOT YET COPIED | [1] NORMAL READ | SAME AS [1] | [2] COPY DATA FROM COPY SOURCE AND THEN READ (DIFFERENCE BIT: ON TO OFF) |
| 2 | | ALREADY COPIED | SAME AS [1] | SAME AS [1] | SAME AS [1] |
| 3 | WRITE | NOT YET COPIED | [3] SAVE ALL NON-COPIED AREAS IN COPY DESTINATION AND WRITE (DIFFERENCE BIT: ON TO OFF) | SAVE IN COPY DESTINATION AND WRITE (DIFFERENCE BIT: ON TO OFF) | [4] COPY DATA FROM COPY SOURCE AND THEN WRITE (DIFFERENCE BIT: ON TO OFF) |
| 4 | | ALREADY COPIED | [5] NORMAL WRITE | SAME AS [5] | SAME AS [5] |

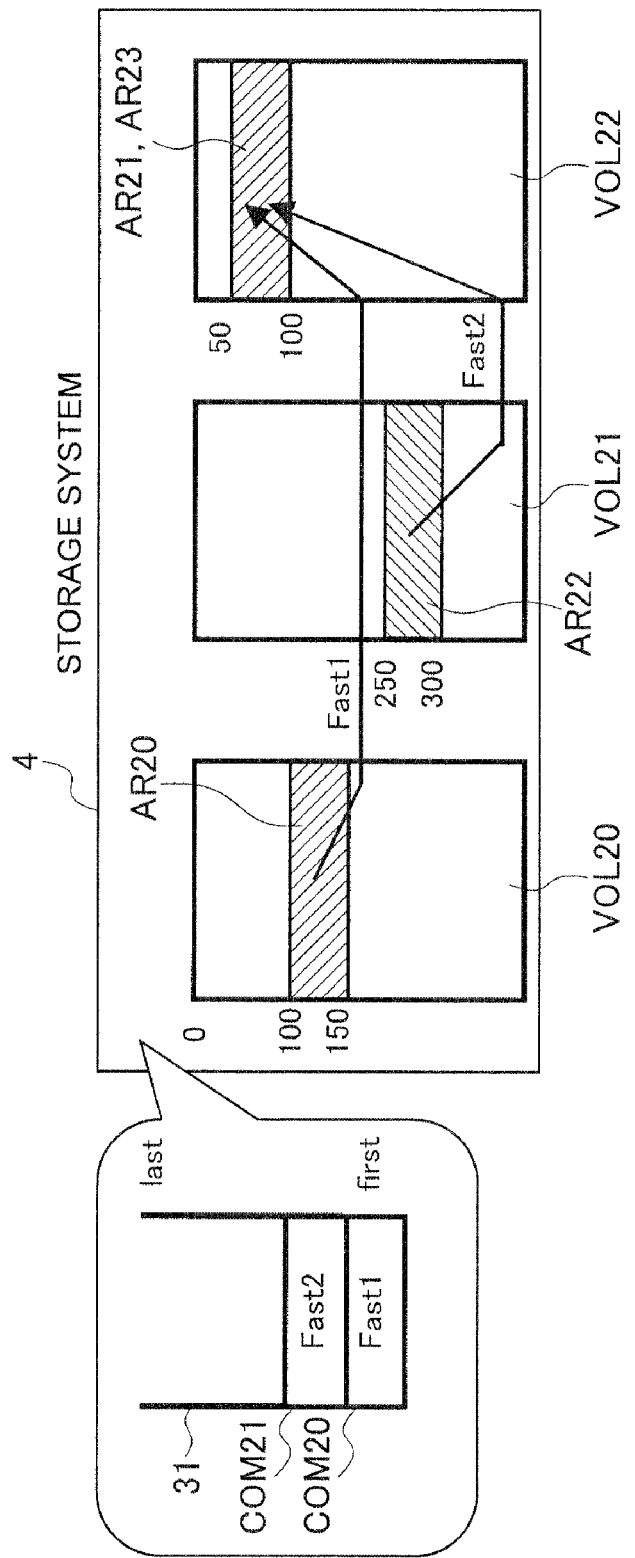

FIG.14

| # | I/O TYPE | I/O DESTINATION | COPY SOURCE | COPY DESTINATION (WITH OVERLAPPING) | COPY DESTINATION (WITHOUT OVERLAPPING) |
|---|---|---|---|---|---|
| 1 | READ | NOT YET COPIED | [1] NORMAL READ | [2] COPY DATA FROM COPY SOURCE OF FAST 2 AND THEN READ(DIFFERENCE BIT: OFF IN BOTH FAST 1 AND FAST 2) | [3] COPY DATA FROM COPY SOURCE AND THEN READ(DIFFERENCE BIT: ON TO OFF) |
| 2 | | ALREADY COPIED | SAME AS [1] | SAME AS [1] | SAME AS [1] |
| 3 | WRITE | NOT YET COPIED | [4] SAVE IN COPY DESTINATION AND WRITE (DIFFERENCE BIT: ON TO OFF) | [5] COPY DATA FROM COPY SOURCE OF FAST 2 AND THEN WRITE(DIFFERENCE BIT: OFF IN BOTH FAST 1 AND FAST 2) | [6] COPY DATA FROM COPY SOURCE AND THEN WRITE(DIFFERENCE BIT: ON TO OFF) |
| 4 | | ALREADY COPIED | [7] NORMAL WRITE | SAME AS [7] | SAME AS [7] |

FIG.16

| # | I/O TYPE | I/O DESTINATION | COPY SOURCE (WITH OVERLAPPING) | COPY SOURCE (WITHOUT OVERLAPPING) | COPY DESTINATION (WITH OVERLAPPING) | COPY DESTINATION (WITHOUT OVERLAPPING) |
|---|---|---|---|---|---|---|
| 1 | READ | NOT YET COPIED | [1] NORMAL READ | SAME AS [1] | [2] COPY DATA FROM COPY SOURCE OF FAST 2 AND THEN READ (DIFFERENCE BIT: OFF IN BOTH FAST 1 AND FAST 2) | [3] COPY DATA FROM COPY SOURCE AND THEN READ (DIFFERENCE BIT: ON TO OFF) |
| 2 | | ALREADY COPIED | SAME AS [1] | SAME AS [1] | SAME AS [1] | SAME AS [1] |
| 3 | WRITE | NOT YET COPIED | [4] SAVE ALL NON-COPIED AREAS IN COPY DESTINATION AND WRITE (DIFFERENCE BIT: ON TO OFF) | [5] SAVE IN COPY DESTINATION AND WRITE (DIFFERENCE BIT: OFF) | [6] COPY DATA FROM COPY SOURCE OF FAST 2 AND THEN WRITE (DIFFERENCE BIT: OFF IN BOTH FAST 1 AND FAST 2) | [7] COPY DATA FROM COPY SOURCE AND THEN WRITE (DIFFERENCE BIT: ON TO OFF) |
| 4 | | ALREADY COPIED | [8] NORMAL WRITE | SAME AS [8] | SAME AS [8] | SAME AS [8] |

STORAGE SYSTEM AND A CONTROL METHOD FOR ACCELERATING THE SPEED OF COPY PROCESSING

TECHNICAL FIELD

This invention relates to a storage system and its control method which is appropriate, for example, for the storage system in which the copy function of copying data from an arbitrary logical volume in the system to the same or another logical volume in the same system (hereinafter referred to as the internal copy function) is installed.

BACKGROUND ART

Conventionally, the copy processing whose copy source and copy destination are specified by addresses is performed by reading data from the copy source address and writing the data to the copy destination address.

One of the methods for shortening the processing time for this type of copy processing is using caches accessible in a short time and performing copy in the caches. By this method, when the relevant copy processing is completed, even before writing the data to the copy destination disk, the data can be accessed from the host device.

As another technology related to the internal copy function, the technology of, when performing the copy processing in units of logical volumes, reporting the completion of the relevant copy processing to the host device before completing the copy processing and then performing the copy processing in the background exists.

SUMMARY OF INVENTION

Technical Problem

The shortening of time for the copy processing in which the copy source and the copy destination are specified by addresses is effective if the amount of data as the copy target is small. However, since multiple copy commands for copying a large amount of data to the same address are sequentially issued from the host device to the storage system, it may be possible that, in the storage system, the subsequent copy commands are made to wait until the processing for the preceding copy command is completed, which may cause time-out in the host device.

Furthermore, if the copy processing is performed in units of logical volumes, the logical volume with the same capacity as the copy source must be prepared as the copy destination in advance, and the storage area not storing data is also included in the copy range. Therefore, the problem arises in that the copy time becomes longer accordingly.

This invention is intended, in view of the above-mentioned problems, for proposing the highly-reliable storage system and its control method capable of accelerating the processing speed of the copy processing seen from the host device.

Solution to Problem

For solving the above-mentioned problem, this invention proposes a storage system comprising a memory set with a command queue for temporarily retaining a command from a host device, and a control unit for storing the command issued from the host device in the command queue, and executing the command stored in the command queue in the order that the command was stored in the command queue, wherein the control unit sets a copy queue for temporarily retaining a copy command among the commands issued from the host device in the memory, moves the copy command among the commands from the host device stored in the command queue to the copy queue and sends an execution completion reply of copy processing according to the command to the host device as a sender of the command, and executes the copy command that was moved to the copy queue in the background in the order that the copy command was stored in the copy queue.

Furthermore, this invention additionally proposes a control method of a storage system which stores a command issued from a host device in a command queue and executes the command stored in the command queue in the order that the command was stored in command queue comprising a first step of setting a copy queue for temporarily retaining a copy command among the commands issued from the host device in the memory, a second step of moving the copy command among the commands from the host device stored in the command queue to the copy queue and sending an execution completion reply of copy processing according to the command to the host device as a sender of the command, and a third step of executing the copy command that was moved to the copy queue in the background in the order that the copy command was stored in the copy queue.

TEMPORARILY RETAINING

Advantageous Effects of Invention

According to this invention, if the host device sequentially issues multiple copy commands for copying a large amount of data to the same address, the host device is not required to wait for the completion of each copy command, which prevents the occurrence of time-out. Therefore, the highly-reliable storage system and its control method capable of accelerating the processing speed of the copy processing seen from the host device can be achieved.

BRIEF DESCRIPTION OF DRAWINGS

FIG. 3 is a table explaining copy queues.

FIG. 4 is a table explaining copy command status.

FIG. 7 is a table explaining a basic pattern of read/write operations.

FIG. 12 is a table explaining an applied pattern of read/write operations.

FIG. 13 is a conceptual diagram explaining an applied pattern of read/write operations.

FIG. 14 is a table explaining an applied pattern of read/write operations.

FIG. 16 is a table explaining an applied pattern of read/write operations.

REFERENCE SIGNS LIST

1: a computing system, 2: a host device, 4: a storage system, 10: a disk device, 12A, 12B: controllers, 22A, 22B: CPUs, 23A, 23B: cache memories, 30: a command queue, 31: a copy queue, 32: a difference bitmap, 40: a hash table, 41: an entry, 42: a bitmap, COM1, COM10, COM11, COM20, COM21, COM30, COM31, COM40, COM41, COM50, COM51, COM60, COM61: copy commands, AR1, AR10, AR12, AR20, AR22, AR30, AR32, AR40, AR42, AR50, AR52, AR60, AR62: copy source areas, AR2, AR11, AR13, AR21, AR23, AR31, AR33, AR41, AR43, AR51, AR53, AR61, AR63: copy destination areas.

Description Of Embodiments

An embodiment of this invention is fully described below with reference to the attached figures.

(1) The Configuration of the Computing System by this Embodiment

Figure 1:
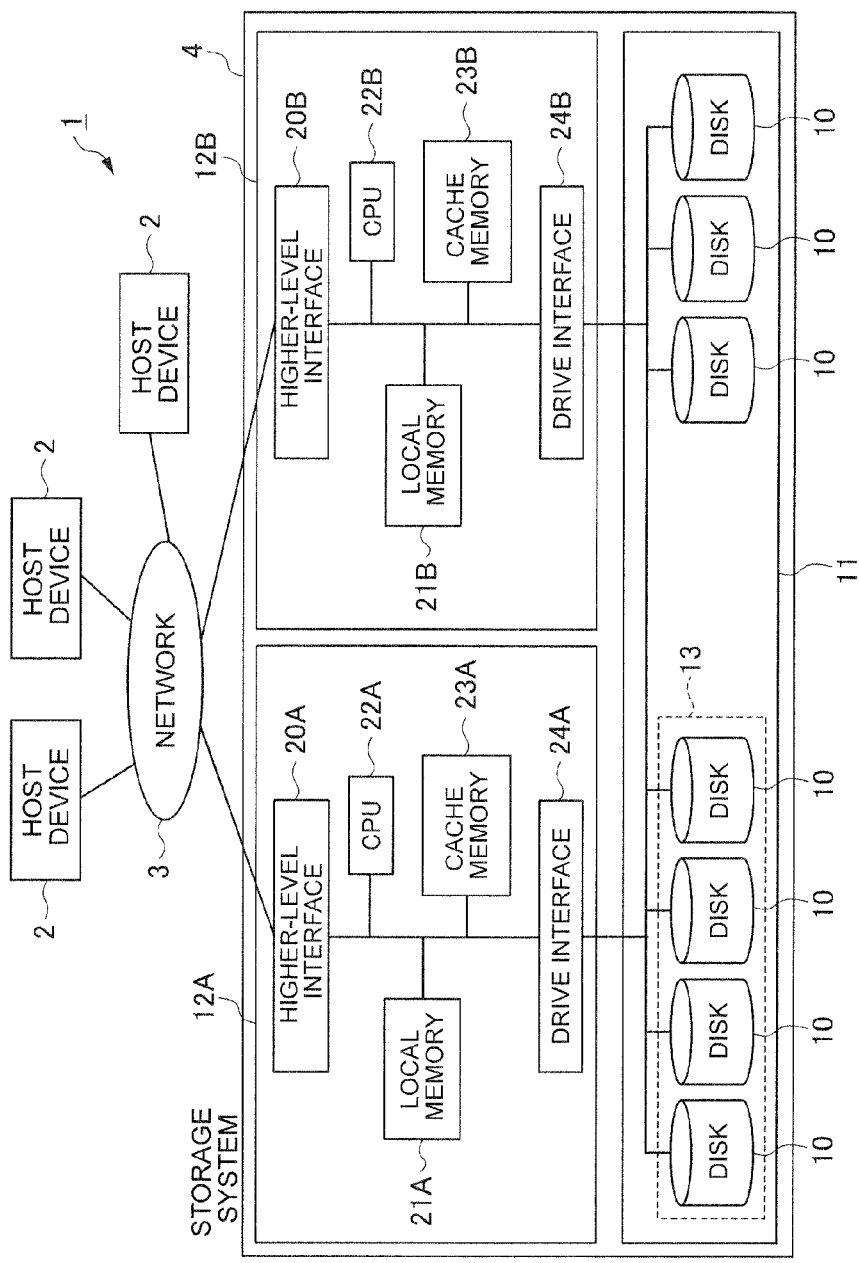
FIG. 1 is a block diagram showing the entire configuration of the computing system by this embodiment.

In FIG. 1, 1 shows the entire computing system by this embodiment. This computing system 1 is configured by multiple host devices 2 connected to the storage system 4 via the network 3.

The host device 2 is a computing device including information processing resources such as a CPU (Central Processing Unit), memories and others configured of, for example, a personal computer, a work station, a mainframe, and others. The host device 2 also includes information input devices such as a keyboard switch, a pointing device, a microphone, and others (not shown in the figure), and information output devices such as a monitor display, a speaker, and others (not shown in the figure).

The network 3 is, for example, configured of LAN (Local Area Network), SAN (Storage Area Network), Internet, a private line, a public line, and others. The communication between the host device 2 and the storage system 4 is performed in accordance with the iSCSI (internet Small Computer System Interface) protocol or the TCP/IP (Transmission Control Protocol/Internet Protocol) protocol if the network 3 is LAN, or performed in accordance with the Fibre Channel protocol if the network 3 is SAN.

The storage system 4 is configured of a storage unit 11 configured of multiple disk devices 10, and the controllers 12A, 12B of the 0 series and the 1 series respectively controlling data input/output for these multiple disk devices 10.

The disk devices 10 are, for example, configured of expensive disks such as SCSI disks and inexpensive disks such as SATA (Serial AT Attachment) disks and optical disks. One RAID group 13 is configured of one or more disk devices 10, one or more logical volumes are set in the physical storage areas provided by each disk device 10 configuring one RAID group 13. The data from the client is stored in these logical volumes, in units of blocks (hereinafter referred to as logical blocks) of a specified size.

To each logical volume, a unique volume number is allocated. In the case of this embodiment, data input/output is performed by making the combination of this volume number and the block number of the logical block allocated to each logical block (LBA: Logical Block Address) an address and specifying the relevant address.

The controllers 12A, 12B respectively include higher-level interfaces 20A, 20B, local memories 21A, 21B, CPUs 22A, 22B, cache memories 23A, 23B, and drive interfaces 24A, 24B.

The higher-level interfaces 20A, 20B are the interfaces for the network 3, configured of NICs (Network Interface Cards) and others. These higher-level interfaces 20A, 20B send and receive write data, read data, various types of commands and others to/from the host device 2 via the network 3.

The local memories 21A, 21B are used for storing control programs read from the specified disk devices 10 when starting up the storage system 4 and also used as the work memories of the CPUs 22A, 22B.

The CPUs 22A, 22B are the processors for responding to the read commands, the write commands, the copy commands and others sent from the host device 2 and controlling the data input/output processing for the disk devices 10, and perform the specified control processing in accordance with the above-mentioned control programs stored in the local memories 21A, 21B.

The cache memories 23A, 23B are used mainly for temporarily storing the data transferred between the higher-level interfaces 20A, 20B and the drive interfaces 24A, 24B. Furthermore, part of the cache memories 23A, 23B is used as the shared memories with the two controllers 12A, 12B of the 0 series and the 1 series. By this method, if a failure occurs in one of the controllers 12A, 12B, the other normal controller 12A, 12B is able to take over the information.

The drive interfaces 24A, 24B are the interfaces for the disk devices 10. These drive interfaces 24A, 24B, by controlling the corresponding disk devices 10 in accordance with the write commands and read commands from the host device 2 issued via the higher-level interfaces 20A, 20B, write/read the write data/read data in the address positions specified by the relevant write commands or read commands in the logical volumes specified by the write commands or read commands.

(2) Various Types of Processing in the Storage System

Next, a sequence of processing performed in the storage system 4 receiving the copy commands from the host device 2 is described below.

Figure 2:
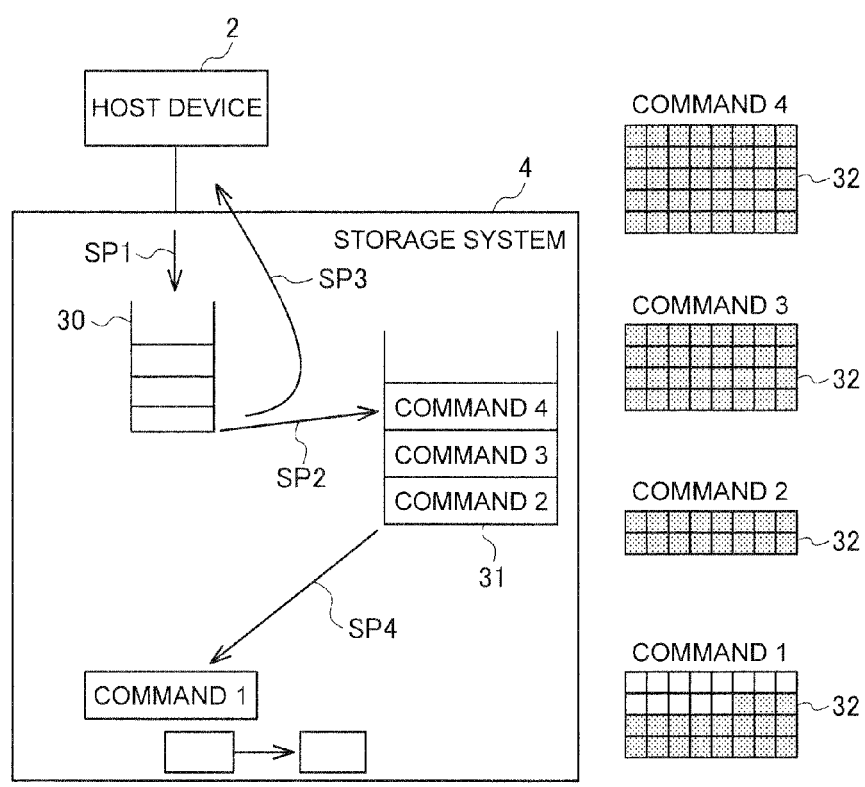
FIG. 2 is a conceptual diagram explaining the internal processing overview of the storage system receiving copy commands.

In the case of this embodiment, the storage system 4, as shown in FIG. 2, includes a command queue 30 for temporarily storing the commands sent from the host device 2 in the cache memories 23A, 23B. The storage system 4 (CPUs 22A, 22B, to be more exact), stores the commands sent from the host device 2 in this command queue 30, and performs the stored commands in order of storage in the relevant command queue 30.

Furthermore, the storage system 4, in addition to the above-mentioned command queue 30, includes a copy queue 31 for temporarily retaining copy commands only, in the cache memories 23A, 23B.

This copy queue 31 is, as shown in FIG. 3, configured of the ID field 31A, the copy source field 31B, the copy destination field 31C, and the status field 31D. The ID field 31A stores the IDs allocated to the corresponding copy commands (hereinafter referred to as copy command IDs).

The copy source field 31B is configured of the LUN field 31BA, the starting address field 31BB, and the ending address field 31BC, the LUN field 31BA stores the volume numbers of the logical volumes specified as the copy sources by the corresponding copy commands, and the starting address field 31BB and the ending address field 31BC respectively store the starting addresses and the ending addresses of the storage areas (hereinafter referred to as copy source areas) specified as the copy sources of the logical volumes.

Similarly, the copy destination field 31C is configured of the LUN field 31CA, the starting address field 31CB, and the ending address field 31CC. The LUN field 31CA stores the volume numbers of the logical volumes specified as the copy destinations by the corresponding copy commands, and the starting address field 31CB and the ending address field 31CC respectively store the starting addresses and the ending addresses of the storage areas (hereinafter referred to as copy destination areas) specified as the copy destinations of the logical volumes.

Furthermore, the status field 31D stores the copy status of the copy from the copy source areas to the copy destination areas. Note that the copy status is, as shown in FIG. 4, the "initial status" that the copy is not performed, the "background copy status" that the background copy is being performed, the "error status" that the copy cannot be performed due to the occurrence of a failure, and the "busy status" that the copy cannot be performed as the target area is used by the other processing.

The storage system 4, when receiving a command from the host device 2, as shown in FIG. 2, stores this command in the command queue 30 (SP1), then determines the type of this command and, if the command is a copy command, moves the relevant copy command to the copy queue 31, and deletes the copy command from the command queue 30 (SP2).

Subsequently, the storage system 4 sends a response that the copy processing corresponding with the copy command is completed (hereinafter referred to as a performance completion response) to the host device 2 (SP3). In this case, as the host device 2, when receiving this copy performance completion response, recognizes that the copy corresponding with the copy command is completed, the subsequent commands for the same address are not made to wait in the relevant host device 2.

Furthermore, subsequently, the storage system 4, in parallel with the processing in accordance with the commands stored in the command queue 30, performs the copy processing in accordance with the copy commands stored in the copy queue 31 in order of storage in the copy queue 31 (SP4).

Note that the storage system 4, when moving the copy commands to the copy queue at the above-mentioned step SP2, creates difference bitmaps 32 showing data difference between the copy source areas and the copy destination areas specified by the copy commands in the cache memories 23A, 23B.

These difference bitmaps 23A, 23B are the respective difference bits made to correspond with the respective unit areas in the copy source areas. Therefore, for example, if the unit area is 64 kilobytes and the copy source area is 256 megabytes, a difference bitmap 32 becomes 512 bytes size.

Furthermore, in the difference bitmap 32, immediately after the copy commands are moved to the copy queue 31, as the data respectively stored in the copy source areas and in the copy destination areas do not coincide, and therefore, all the difference bits are set to ON ("1").

The storage system 4, each time it completes the background copy of a unit area of data in the copy source area to the copy destination area, sets the corresponding difference bit to OFF ("0"). Furthermore, the storage system 4, when completing the copy processing in the background in accordance with one copy command stored in the copy queue 31, deletes the entry of the copy command from the copy queue 31 and also deletes the difference bitmap 32 made to correspond with the relevant copy command from the cache memories 23A, 23B.

Meanwhile, the host device 2, after issuing a copy command as mentioned above, at the time when it receives the corresponding copy performance completion response, recognizes that the copy processing in accordance with the copy command is completed. Therefore, subsequently, before the copy processing in accordance with the copy command is completed, the host device 2 is able to issue read commands targeted for the copy destination areas of the copy command and write commands intending to rewrite the data stored in the copy source areas of the copy command.

Therefore, for installing the above-mentioned background copy function in the storage system 4, the storage system 4 must be configured to be able to send the data which should be stored in the copy destination areas as read data to the host device 2 after completing the copy command, even in cases where the read command is received before the completion of the copy processing in accordance with the copy command. Similarly, in cases the write command is received before the completion of the copy processing in accordance with the copy command, the storage system 4 must be configured to be able to save data stored in the copy destination areas of the copy command before performing the write command.

As one of the methods for satisfying the former requirement, the method in which the storage system 4, if receiving a read command from the host device 2, searches the entire copy queue 31 and, if any unperformed copy command whose copy destination area partially or entirely overlaps with the storage area (hereinafter referred to as a read area) specified as the area whose data should be read by the read command exists, performs the read command after performing the copy command can be considered.

Meanwhile, as one of the methods for satisfying the latter requirement, the method in which the storage system 4, if receiving a write command from the host device 2, searches the entire copy queue 31 and, if any unperformed copy command whose copy area partially or entirely overlaps with the storage area (hereinafter referred to as a write area) specified as the area whose data should be written by the write command exists, performs the write command after performing the copy command can be considered.

However, as the above-mentioned processing for searching the entire copy queue 31 takes a fair amount of time, if such processing for searching the entire copy queue 31 is to be performed each time [the storage system 4] receives a read command or a write command, the response performance of the storage system 4 for read commands and write commands will deteriorate.

Figure 5:
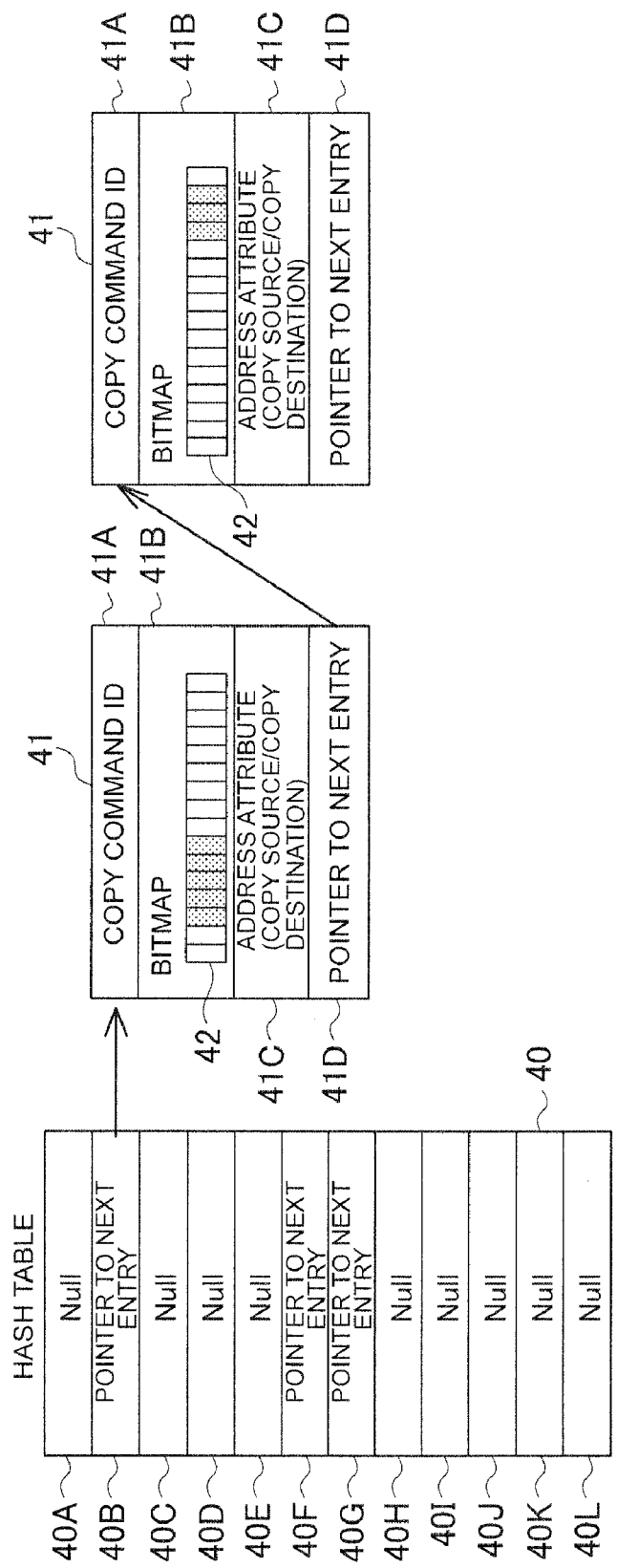
FIG. 5 is a conceptual diagram explaining a hash table.

Therefore, in the case of this embodiment, in the storage system 4, as the means for speeding up the search processing, the hash table 40 as shown in FIG. 5 is provided.

This hash table 40 is configured of multiple slots 40A to 40L and, to each of these slots 40A to 40L, the numeral from "0" to "slot number −1" is made to correspond sequentially.

The storage system 4, when receiving a copy command, for each of the copy source areas and the copy destination areas of the copy command (hereinafter appropriately and collectively referred to as copy command target areas), an entry 41 of the hash table 40 is created as shown in FIG. 5.

This entry 41 is created, for example, in units of areas delimited by each 1-megabyte border. Therefore, for example, if 1 megabyte is specified to be 1024 kilobytes and 1 address to be 1 kilobyte and the addresses of the target areas specified by the copy command are "1000" to "1200," one entry 41 is created for the target areas whose addresses are "1000" to "1023," and another entry 41 is created for the target areas whose addresses are "1024" to "1200." Hereinafter, sequentially delimiting the target areas specified by the copy command by each 1-megabyte border of the address as mentioned above is referred to as "rounding off the target areas by each 1-megabyte border"

An entry 41 is, as clearly shown in FIG. 5, configured of the copy command ID field 41A, the bitmap field 41B, the address attribute field 41C, and the pointer field 41D.

The copy command field 41A stores the copy command ID corresponding with the copy command, and the bitmap field 41B stores the bitmap 42 configured of multiple difference bits respectively made to correspond with respective delimited areas created by delimiting the corresponding 1-megabyte target area in units of the above-mentioned unit areas (e.g. 64-kilobyte areas).

Meanwhile, the address attribute field 41C stores the attribute information showing whether the target area made to correspond with the entry 41 is the copy source area or the copy destination area, and the pointer field 41D, if the next entry 41 for the same copy command exists, stores the pointer to the entry 41 (the starting address of the area storing the data of the entry 41 in the cache memories 23A, 23B, hereinafter referred to as the hash pointer).

The storage system 4 creates one or more entries 41 corresponding with the target areas (the copy source area and the copy destination area) of the received copy command for each target area and, for each of these target areas, divides each starting address by the number of slots in the hash table 40, and makes the correspondence of the slots made to correspond with the remainder value (hereinafter referred to as the target slot) 40A to 40K or 40L with the entries 41 of the copy command.

As more specifically described, the storage system 4, if no entries of the other copy command are made to correspond with the target slots 40A to 40K or 40L in accordance with the target areas of the copy command, stores the hash pointer for the first entry 41 of the relevant target area in the target slots 40A to 40K or 40L or, if the correspondence is already made, stores the hash pointer for the first entry 41 of the relevant target area in a pointer field 41D of the last entry 41 corresponding with the target slots 40A to 40K or 40L.

The storage system 4, for the bitmap 42 stored in the bitmap field 41B of the first entry 41, sets each difference bit corresponding with the above-mentioned delimited area included in the target area of the copy command to ON ("1").

Furthermore, the storage system 4, as for next and subsequent entries 41 of the target areas, stores the hash pointer of each entry 41 in the pointer field 41D in the prior entry 41 and also, as for the bitmaps 42 stored in the bitmap field 41B of the next and subsequent entries 41, sets each difference bit corresponding with the delimited area included in the target area to ON ("1").

The above-mentioned correspondence of the entries 41 in the copy commands with the slots 40A to 40L in the hash table 40 is made when registering the copy commands to the copy queue 31. Then, the respective entries 41 made to correspond with the slots 40A to 40L are deleted after the copy in accordance with the corresponding copy command is completed.

As mentioned above, the storage system 4, when receiving a read command or write command from the host device 2, firstly divides the starting address of the read area specified by the read command or the write area specified by the write command by the number of slots in the hash table 40, refers to the bitmaps 42 respectively stored in the bitmap field 42 of each of the entry 41 made to correspond with the slots 40A to 40L which were made to correspond with the remainder value of that time, and determines whether there are any copy commands whose copy destination areas are, as mentioned above, part of or the entire read area or write area specified by the read command or write command received at that time and which are not yet performed.

Figure 6:
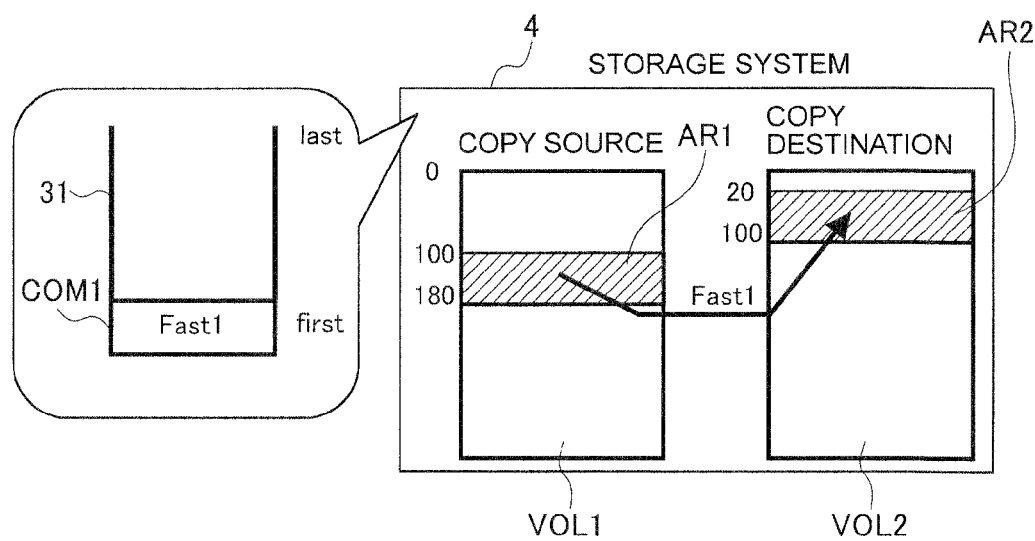
FIG. 6 is a conceptual diagram explaining a basic pattern of read/write operations.

(3) Flow of Read Processing or Write Processing in the Storage System (3-1) Basic Operation Patterns Next, as shown in FIG. 6, an operation pattern of the storage system 4 in the case, if a copy command COM1 for copying data from the copy source area AR1 in a logical volume VOL1 to the copy destination area AR2 in another logical volume VOL2 is stored in the copy queue 31, the storage system 4 performs the read command or write command whose read area or write area partially or entirely overlaps with the copy source area AR1 or the copy destination area AR2 of the copy command COM1 is described below.

FIG. 7 shows the concrete contents of the read processing and the write processing, under the above-mentioned condition for FIG. 6, performed by the storage system 4 for, among the read area or the write area specified by the read command or the write command, the areas overlapping with the copy source area AR1 and the copy destination area AR2 of the copy command COM1. Note that, among the read areas or the write areas, for the areas not overlapping with the copy source area AR1 or the copy destination area AR2, the normal read processing or write processing is performed.

As shown in FIG. 7, the storage system 4, if it is going to perform a read command and the read area specified by the read command partially or entirely overlaps with the copy source area AR1 of the copy command COM1, regardless of whether the copy in accordance with the copy command COM1 is not yet performed or already performed for the overlapping area of the read area, reads the data normally (refer to the "Copy source" field in the row whose "#" is "1" or "2" in FIG. 7). The same processing is to be performed if the read area specified by the read command partially or entirely overlaps with the copy destination area AR2 of the copy command COM1 (refer to the "Copy destination" field in the row whose "#" is "2" in FIG. 7).

Meanwhile, the storage system 4, if it is going to perform a read command and the read area specified by the read command partially or entirely overlaps with the copy destination area AR2 of the copy command COM1 and the copy in accordance with the copy command COM1 is not performed for the overlapping area, for the overlapping area of the read area, after performing the copy in accordance with the copy command COM1, reads the data from the relevant overlapping area (refer to the "Copy destination" field in the row whose "#" is "1" in FIG. 7).

Figure 8:
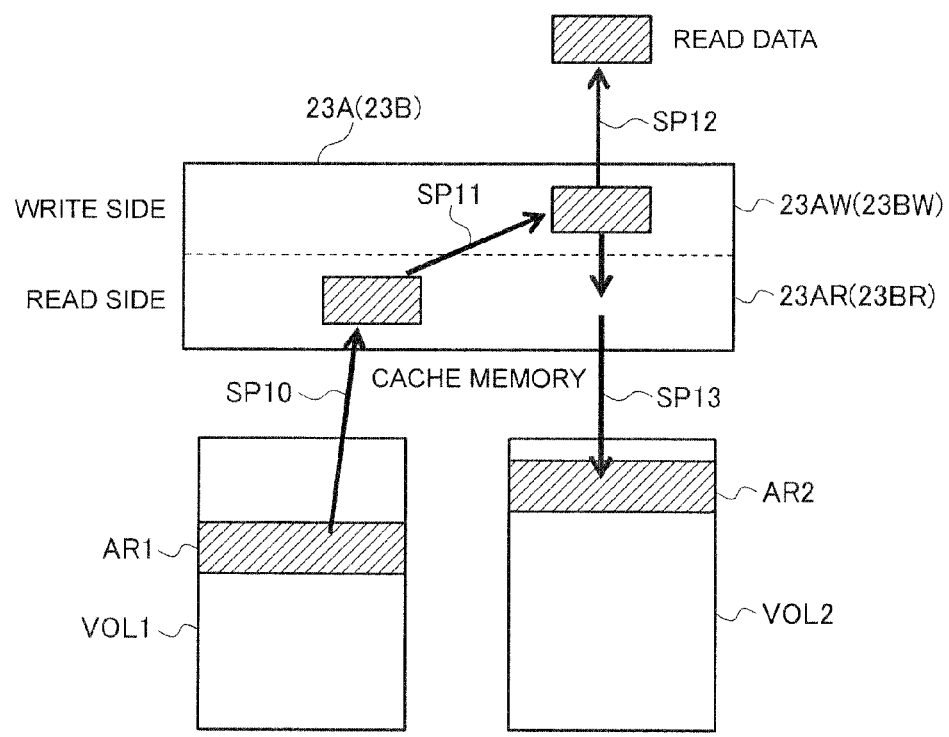
FIG. 8 is a conceptual diagram explaining a basic pattern of read/write operations.

As more specifically described, the storage system 4, as shown in FIG. 8, firstly reads the data stored in the area overlapping with the read area of the copy source area AR1 of the copy command COM1 to the read sides 23AR, 23BR of the cache memories 23A, 23B (SP10). The storage system 4, subsequently, copies this data to the write sides 23AW, 23BW of the cache memories 23A, 23B (SP11).

Next, the storage system 4 sends the data copied to the write sides 23AW, 23BW of the cache memories 23A, 23B as read data to the host device 2 (SP12), writes the relevant read data to the copy destination area AR2 of the copy command COM1 and, in accordance with this, changes the difference bits corresponding with the areas which performed the copy corresponding with the copy command COM1 in the difference bitmap 32 (FIG. 2) from ON to OFF (SP13).

Meanwhile, the storage system 4, if it is going to perform a write command and the write area specified by the relevant write command partially or entirely overlaps with the copy source area AR1 of the copy command COM1 and the copy in accordance with the copy command COM1 is not performed for the overlapping area, for the overlapping area of the write area, saves the data stored in the relevant overlapping area to the corresponding copy destination area AR2 specified by the copy command COM1, and then writes the write data (refer to the "Copy source" field in the row whose "#" is "3" in FIG. 7).

Figure 9:
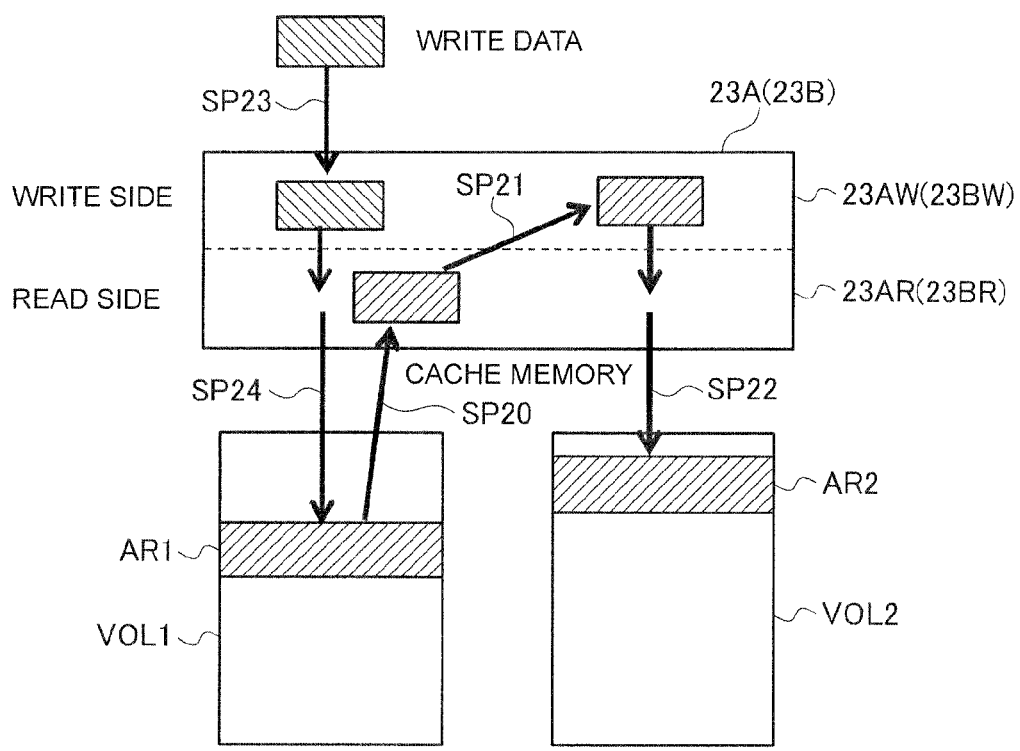
FIG. 9 is a conceptual diagram explaining a basic pattern of read/write operations.

As more specifically described, the storage system 4, as shown in FIG. 9, firstly reads the data stored in the area overlapping with the write area of the copy source area AR1 of the copy command COM1 to the read sides 23AR, 23BR of the cache memories 23A, 23B (SP20). The storage system 4, subsequently, copies this data to the write sides 23AW, 23BW of the cache memories 23A, 23B (SP21), and copies the data copied to the write sides 23AW, 23BW of the cache memories 23A, 23B to the copy destination area AR2 of the copy command COM1 (SP22).

Next, the storage system 4 receives the write data provided by the host device 2 and writes it to the write sides 23AW, 23BW of the cache memories 23A, 23B (SP23). The storage system 4 then reads this write data from the cache memories 23A, 23B, and writes it to the write area specified by the write command. The storage system 4, for the difference bitmap 32 (FIG. 2) corresponding with the copy command COM1, changes the difference bits corresponding with the areas to which the data was copied at step SP22 from ON to OFF (SP24).

Meanwhile, the storage system 4, if it is going to perform a write command and the write area specified by the write command partially or entirely overlaps with the copy destination area AR2 of the copy command COM1 and the copy in accordance with the copy command COM1 is not performed for the overlapping area, for the overlapping area of the write area, copies the data stored in the relevant overlapping area to the copy destination area AR2 of the relevant copy command, and then writes the write data (refer to the "Copy destination" field in the row whose "#" is "3" in FIG. 7).

Figure 10:
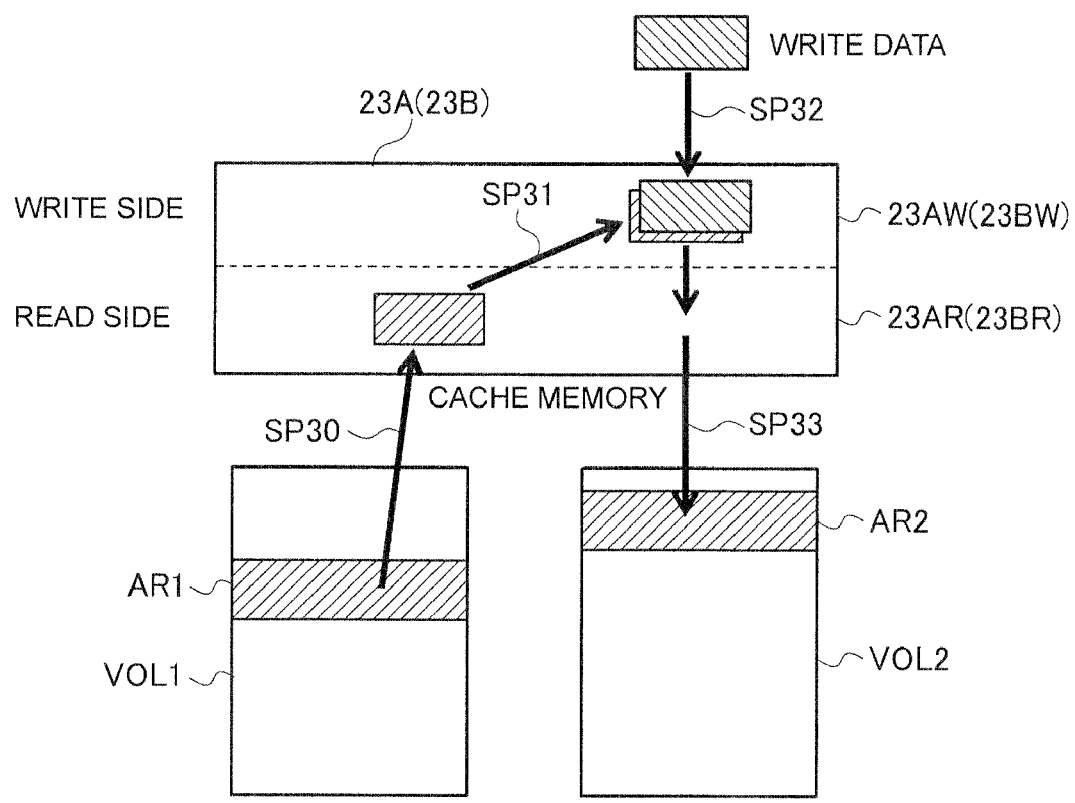
FIG. 10 is a conceptual diagram explaining a basic pattern of read/write operations.

As more specifically described, the storage system 4, as shown in FIG. 10, firstly reads the data from the area overlapping with the write area of the copy source area AR1 of the copy command COM1 to the read sides 23AR, 23BR of the cache memories 23A, 23B (SP30), and copies this data to the write sides 23AW, 23BW of the cache memories 23A, 23B (SP31).

The storage system 4 then overwrites the above-mentioned data copied to the write sides 23AW, 23BW of the cache memories 23A, 23B with the write data received from the host device 2 (SP32). Subsequently, the storage system 4 writes the data overwritten with the write data to the copy destination area AR2 of the copy command COM1, and changes the difference bits corresponding with the write area overlapping with the copy source area AR1 of the relevant copy command COM1 in the difference bitmap 32 (FIG. 2) corresponding with the copy command COM1 from ON to OFF (SP33).

(3-2) Operation Pattern when Two Related Copy Commands Exist

Next, the operation pattern of the storage system 4 in the case, if two copy commands whose copy source areas and/or copy destination areas overlap are stored in the copy queue 31, the storage system 4 performs the read command or write command is described below.

Note that, in the description below, among the read areas or the write areas specified by the read commands or write commands, for the areas not overlapping with these two copy source areas or copy destination areas, the normal read processing or write processing is performed.

(3-2-1) First Applied Operation Pattern

Figure 11:
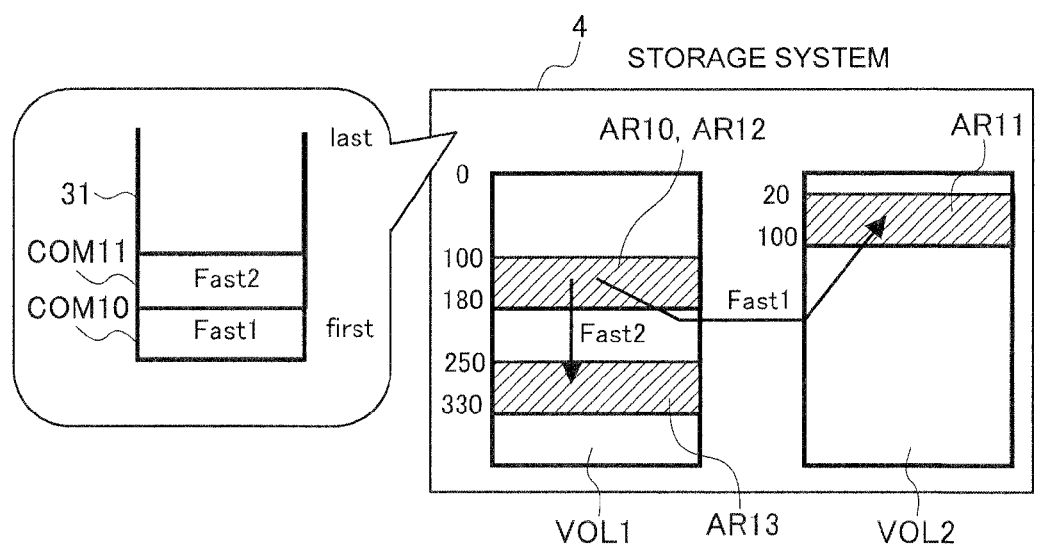
FIG. 11 is a conceptual diagram explaining an applied pattern of read/write operations.

FIG. 11 shows the case where the first and second copy commands COM10 and COM11 whose copy source areas AR10 and AR12 overlap are registered in the copy queue 31. This case assumes that they were registered to the copy queue 31 in order of the first copy command COM10 and the second copy command COM11, and that these first and second copy commands COM10 and COM11 are performed in this order.

FIG. 12 shows the concrete contents of the read processing and the write processing performed by the storage system 4 in the above-mentioned case where the storage system 4 performs a read command or write command whose read area or write area partially or entirely overlaps with the copy source areas AR10, AR12 or the copy destination areas AR11, AR13 of the first and/or second copy commands COM10, COM11, for the areas among the read area or write area overlapping with the copy source areas AR10, AR12 or the copy destination areas AR11, AR13.

In FIG. 12, the "Copy source (with overlapping)" column shows the contents of the processing by the storage system 4 in the case the read area or write area specified by the read command or write command to be performed at that time partially or entirely overlaps with the respective copy source areas AR10, AR12 of the first and second copy commands COM10, COM11.

Meanwhile, the "Copy source (without overlapping)" column shows the contents of the processing by the storage system 4 in the case the read area or write area specified by the read command or write command to be performed at that time does not overlap with the respective copy source areas AR10, AR12 of the first and second copy commands COM10, COM11 (but overlaps with the copy source areas AR10, AR12 of the first and second copy commands COM10, COM11 other than the relevant overlapping area).

Furthermore, the "Copy destination" column shows the contents of the processing by the storage system 4 in the case the read area or write area specified by the read command or write command to be performed at that time overlaps with the copy destination areas AR10, AR12 of the first and second copy commands COM10, COM11.

The storage system 4, if it performs a read command and the read area specified by the relevant read command partially or entirely overlaps with the respective copy source areas AR10, AR12 of the first and second copy commands COM10, COM11, for the area of the read area overlapping with the relevant overlapping part, regardless of whether the copy in accordance with the copy commands COM10, COM11 is not yet performed or already performed, reads the data normally (refer to the "Copy source (with overlapping)" field in the row whose "#" is "1" in FIG. 12).

The storage system 4, if the read area specified by the read command does not overlap with the overlapping parts of the copy source areas AR10, AR12 of the first and second copy commands COM10, COM11, for the area of the read area overlapping with the copy source areas AR10, AR12 of the first and second copy commands COM10, COM11, regardless of whether the copy in accordance with the copy commands COM10, COM11 is not yet performed or already performed, reads the data normally (refer to the "Copy source (without overlapping)" field in the row whose "#" is "1" and "2" in FIG. 12).

Meanwhile, the storage system 4, if the read area specified by the read command partially or entirely overlaps with either one of the copy destination areas AR11, AR13 of the first or second copy commands COM10, COM11 and the copy in accordance with the corresponding first or second copy command COM10, COM11 is not performed for the overlapping area, as explained with reference to FIG. 8, for the area overlapping with the copy destination areas AR11, AR13 of the first or second copy command COM10, COM11 of the read area, after performing the copy in accordance with the relevant first or second copy command COM10, COM11, reads the data. Furthermore, the storage system 4, along with this processing, changes the difference bits corresponding with the areas to which the data was copied as mentioned above in the difference bitmap 32 (FIG. 2) corresponding with the first or second copy command COM10, COM11 from ON to OFF (refer to the "Copy destination" field in the row whose "#" is "1" in FIG. 12).

The storage system 4, if the read area specified by the read command partially or entirely overlaps with the copy destination areas AR11, AR13 of either one of the first and second copy commands COM10, COM11 and the corresponding first or second copy command COM10, COM11 for the overlapping area is already performed, for the relevant overlapping area, reads the data normally (refer to the "Copy destination" field in the row whose "#" is "2" in FIG. 12).

Meanwhile, the storage system 4, if it performs a write command and the write area specified by the relevant write command partially or entirely overlaps with the overlapping parts of the respective copy source areas AR10, AR12 of the first and second copy commands COM10, COM11 and the copy for the overlapping area (for the area of the read area overlapping with the relevant overlapping part) in accordance with the first and second copy commands COM10, COM11 is not yet performed, for the relevant overlapping area, saves the data to the copy destination areas AR11, AR13 of the respectively corresponding first or second copy command COM10, COM11.

Furthermore, the storage system 4, along with this processing, changes the difference bits corresponding with the areas where data was saved at that time in the difference bitmap 32 respectively corresponding with the first and second copy commands COM10, COM11 from ON to OFF, and then writes data to the write area specified by the write command (refer to the "Copy source (with overlapping)" field in the row whose "#" is "3" in FIG. 12).

Furthermore, the storage system 4, if the write area specified by the write command partially or entirely overlaps with the overlapping parts in the respective copy source areas AR10, AR12 of the first and second copy commands COM10, COM11 and the copy in accordance with the first and second copy commands COM10, COM11 are already performed for the overlapping area (the area overlapping with the overlapping part in the read area), for the relevant overlapping area, writes the write data normally (refer to the "Copy source (with overlapping)" field in the row whose "#" is "4" in FIG. 12).

Furthermore, the storage system 4, if the write area specified by the write command does not overlap with the overlapping parts of these two copy source areas AR10, AR12 of the respective copy source areas AR10, AR12 of the first and second copy commands COM10, COM11 (but partly overlaps with the copy source areas AR10, AR12 of the first or second copy commands COM10, COM11 other than the relevant overlapping part) and the copy in accordance with the corresponding first and second copy commands COM10, COM11 is not yet performed for the areas overlapping with the copy source areas AR10, AR12 of the write area, for the overlapping areas, as explained with reference to FIG. 9, saves the data stored in the copy source areas AR10, AR12 of the first or second copy command COM10, COM11 to the copy destination areas of the relevant first or second copy command COM10, COM11, and then writes the write data (refer to the "Copy source (without overlapping)" field in the row whose "#" is "3" in FIG. 12).

The storage system 4, if the write area specified by the write command does not overlap with the overlapping parts of these two copy source areas AR10, AR12 of the respective copy source areas AR10, AR12 of the first and second copy commands COM10, COM11 (but partly overlaps with the copy source areas AR10, AR12 of the first or second copy command COM10, COM11 other than the relevant overlapping part) and the copy in accordance with the corresponding first or second copy command COM10, COM11 is already performed for the areas overlapping with the copy source areas AR10, AR12 of the write area, for the overlapping areas, writes the write data normally (refer to the "Copy source (without overlapping)" field in the row whose "#" is "4" in FIG. 12).

Meanwhile, the storage system 4, if the write area specified by the write command partially or entirely overlaps with the copy destination areas AR11, AR13 of the first or second copy command COM10, COM11 and the copy for the overlapping area in accordance with the corresponding first or second copy command COM10, COM11 is not yet performed, for the overlapping area, copies the data stored in the relevant overlapping areas to the copy destination areas AR11, AR13 of the relevant first or second copy command COM10, COM11, and then writes the write data (refer to the "Copy destination" field in the row whose "#" is "3" in FIG. 12).

Furthermore, the storage system 4, if the write area specified by the write command partially or entirely overlaps with the copy destination areas AR11, AR13 of the first or second copy command COM10, COM11 and the copy for the overlapping area in accordance with the corresponding first or second copy command COM10, COM11 is already performed, for the relevant overlapping area, writes the write data normally (refer to the "Copy destination" field in the row whose "#" is "4" in FIG. 12).

(3-2-2) Second Applied Operation Pattern

Next, as shown in FIG. 13, the case where the first and second copy commands COM20, COM21 ("Fast1" and "Fast2") whose copy destination areas AR21, AR23 partially or entirely overlap are registered to the copy queue 31 is described below.

Note that the storage system 4, when performing the first copy command COM20, searches whether there is any area in the copy destination area AR21 of the first copy command COM20 overlapping with the copy destination area AR23 of the second copy command COM23 and, if there is, after performing the first copy command COM20, sets the difference bit for the relevant overlapping part in the difference bitmap 32 corresponding with the second copy command COM21 to OFF.

FIG. 14 shows the concrete contents of the read processing and the write processing performed by the storage system 4 in the above-mentioned case where the storage system 4 receives a read command or write command whose read area or write area partially or entirely overlaps with the copy source areas AR20, AR22 or the copy destination areas AR21, AR23 of the first and/or second copy command COM20, COM21.

In FIG. 14, the "Copy source" column shows the contents of the operation of the storage system 4 in the case the read area or write area specified by the read command or write command to be performed at that time partially or entirely overlaps with the copy destination areas AR20, AR21 of the first or second copy command COM20.

Meanwhile, the "Copy destination (with overlapping)" column in FIG. 14 shows the contents of the operation of the storage system 4 in the case the read area or write area specified by the read command or write command to be performed at that time partially or entirely overlaps with the overlapping parts of the respective copy destination areas AR21, AR23 of the first and second copy commands COM20, COM21.

Furthermore, the "Copy destination (without overlapping)" column in FIG. 14 shows the contents of the operation of the storage system 4 in the case the read area or write area specified by the read command or write command to be performed at that time does not overlap with the overlapping parts of the respective copy destination areas AR21, AR23 of the first and second copy commands COM20, COM21 (but overlaps with the copy source areas AR20, AR22 of the first or second copy command COM20, COM21 other than the relevant overlapping part).

The storage system 4, if it is going to perform a read command and the read area specified by the relevant read command partially or entirely overlaps with either one of the copy source areas AR20, AR22 of the first and second copy commands COM20, COM21, regardless of whether the copy in accordance with the first and second copy commands COM20, COM21 is not yet performed or already performed for the overlapping area, for the relevant overlapping area, reads the data normally (refer to the "Copy source" field in the row whose "#" is "1" and "2" in FIG. 12).

The storage system 4, if the read area specified by the read command partially or entirely overlaps with the overlapping parts in the copy destination areas AR21, AR23 of the first and second copy commands COM20, COM21 and the copy in accordance with the copy commands COM20, COM21 is not yet performed or already performed for the overlapping area (the area overlapping with the overlapping part of the read area), for the relevant overlapping area, completes the copy processing with reference to the second copy command COM21, and then reads the data. Furthermore, the storage system 4, along with this processing, changes the difference bit for the area where the copy was performed as mentioned above in the difference bitmap 32 corresponding with the first and second copy commands COM20, COM21 from ON to OFF (refer to the "Copy destination (with overlapping)" field in the row whose "#" is "1" in FIG. 14).

Furthermore, the storage system 4, if the read area specified by the read command partially or entirely overlaps with the overlapping parts in the copy source areas AR20, AR21 of the first and second copy commands COM20, COM21 and the copy in accordance with the first and second copy commands COM20, COM21 is already performed for the overlapping part (the area overlapping with the corresponding overlapping part of the read area), for the relevant overlapping area, reads the data normally (refer to the "Copy destination (with overlapping)" field in the row whose "#" is "2" in FIG. 14).

Meanwhile, the storage system 4, if the read area specified by the read command does not overlap with the overlapping parts of the copy destination areas AR21, AR23 of the first and second copy commands COM20, COM21 (but partly overlaps with the copy source areas AR20, AR22 of the first or second copy command COM20, COM21 other than the relevant overlapping part) and the copy in accordance with the corresponding first or second copy command COM20, COM21 is not yet performed for the areas overlapping with the copy destination areas AR21, AR23 of the read area, for the overlapping areas, as explained with reference to FIG. 8, performs the first and second copy commands COM20, COM21, and then reads the data.

Furthermore, the storage system 4, from the difference bitmap 32 (FIG. 2) corresponding with the first or second copy command COM20, COM21, changes the difference bit corresponding with the area where the copy was performed at that time from ON to OFF (refer to the "Copy destination (without overlapping)" field in the row whose "#" is "1" in FIG. 14).

Meanwhile, the storage system 4, if the read area specified by the read command does not overlap with the overlapping parts of the copy destination areas AR21, AR23 of the first and second copy commands COM20 (but partly overlaps with the copy source areas AR20, AR22 of the first or second copy command COM20, COM21 other than the relevant overlapping part) and the copy in accordance with the corresponding first and second copy commands COM20, COM21 is already performed for the areas overlapping with the copy destination areas AR21, AR23 of the read area, for the overlapping areas, reads the data normally (refer to the "Copy destination (without overlapping)" field in the row whose "#" is "2" in FIG. 14).

Meanwhile, the storage system 4, if it performs a write command and the write area specified by the relevant write command partially or entirely overlaps with the copy source areas AR20, AR22 of the first or second copy command COM20, COM21 and the copy in accordance with the first or second copy command COM20, COM21 is not yet performed for the overlapping area, as explained with reference to FIG. 9, for the overlapping area, saves the data stored in the relevant overlapping area to the copy destination areas AR21, AR23 of the first or second copy command COM20, COM21, and then writes the write data normally (refer to the "Copy source" field in the row whose "#" is "3" in FIG. 14).

Meanwhile, the storage system 4, even if the write area specified by the write command partially or entirely overlaps with either one of the copy source areas AR20, AR21 of the first and second copy commands COM20, COM21, if the copy in accordance with the first or second copy command COM20, COM21 is already performed for the overlapping area, for the overlapping area, writes the write data normally (refer to the "Copy source" field in the row whose "#" is "4" in FIG. 14).

Furthermore, the storage system 4, if the write area specified by the write command partially or entirely overlaps with the respective copy destination areas AR21, AR23 of the first and second copy commands COM20, COM21 and the copy in accordance with the first and second copy commands COM20, COM21 is not yet performed for the overlapping area (the area overlapping with the overlapping part of the write area), for the overlapping area, copies the data stored in the copy source area AR22 of the second copy command COM21, and writes the write data. Furthermore, the storage system 4 sets each difference bit corresponding with the area where the relevant copy was performed in the difference bitmap 32 corresponding with each of the first and second copy commands COM20, COM21 to OFF (refer to the "Copy destination (with overlapping)" field in the row whose "#" is "3" in FIG. 14).

Meanwhile, the storage system 4, if the write area specified by the write command partially or entirely overlaps with the overlapping parts of the respective copy destination areas AR21, AR23 of the first and second copy commands COM20, COM21 and the copy in accordance with the first and second copy commands COM20, COM21 for the overlapping area (the area overlapping with the overlapping part of the write area) is already performed, for the overlapping area, writes the write data normally (refer to the "Copy destination (with overlapping)" field in the row whose "#" is "4" in FIG. 14).

Furthermore, the storage system 4, if the write area specified by the write command does not overlap with the overlapping parts of the respective copy destination areas AR21, AR23 of the first and second copy commands COM20, COM21 (but overlaps with the copy destination areas AR21, AR23 of the first or second copy command COM20, COM21 other than the relevant overlapping part) and the copy in accordance with the corresponding first or second copy command COM20, COM21 is not yet performed for the areas overlapping with the copy destination areas AR21, AR23 of the write area, for the overlapping areas, as explained with reference to FIG. 10, copies the data stored in the copy source areas AR20, AR22 of the first or second copy command COM20, COM21, and then writes the write data (refer to the "Copy destination (without overlapping)" field in the row whose "#" is "3" in FIG. 14).

Meanwhile, the storage system 4, if the write area specified by the write command from the host device 2 does not overlap with the overlapping parts of the copy destination areas AR21, AR23 of the respective copy destination areas AR21, AR23 of the first and second copy commands COM20, COM21 (but overlaps with the copy destination areas AR21, AR23 of the first or second copy command COM20, COM21 other than the relevant overlapping part) and the corresponding first or second copy command COM20, COM21 is already performed for the area overlapping with the copy destination areas AR21, AR23 of the write area, for the overlapping area, writes the write data normally (refer to the "Copy destination (without overlapping)" field in the row whose "#" is "4" in FIG. 14).

(3-2-3) Third Operation Pattern

Figure 15:
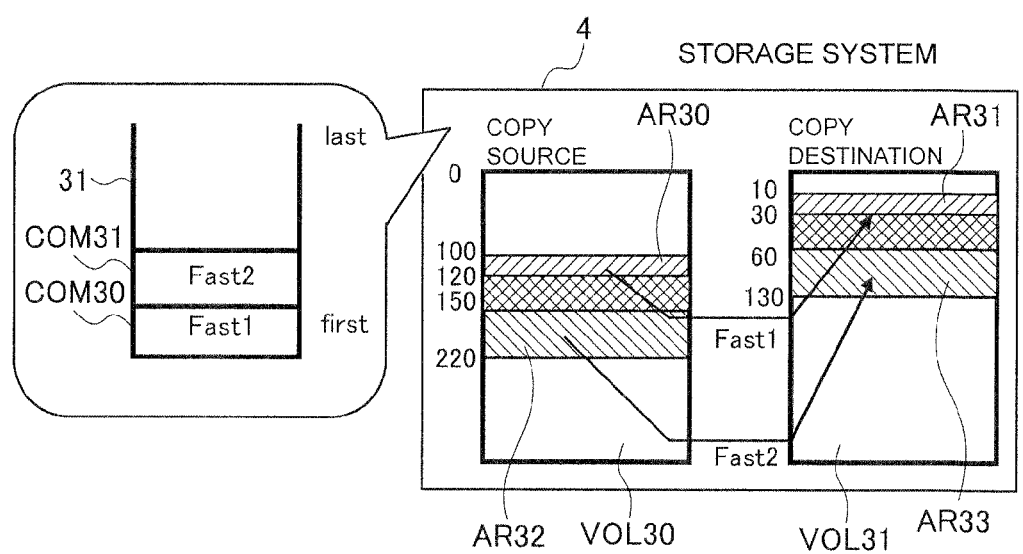
FIG. 15 is a conceptual diagram explaining an applied pattern of read/write operations.

Next, as shown in FIG. 15, the case where the first and second copy commands COM30, COM31 ("Fast1" and "Fast2") whose copy source areas AR30, AR32 partially or entirely overlap with the copy destination areas AR31, AR33 are registered to the copy queue 31 is described below.

In FIG. 15, the copy source area AR30 of the first copy command COM30 is the area of addresses "100" to "150" in the first logical volume VOL30, the copy destination area AR31 of the relevant first copy command COM30 is the area of addresses "10" to "60" in the second logical volume VOL31, the copy source area AR32 of the second copy command COM31 is the area of addresses "120" to "220" in the first logical volume VOL30, and the copy destination area AR33 of the relevant second copy command COM31 is the area of addresses "30" to "130" in the second logical volume VOL31. This case also assumes that the first and the second copy commands COM30 and COM31 were registered to the copy queue 31 in this order.

FIG. 16 shows the concrete contents of the read processing and the write processing performed by the relevant storage system 4 in the above-mentioned case where the storage system 4 receives a read command or write command whose read area or write area partially or entirely overlaps with the copy source areas AR30, AR32 or the copy destination areas AR31, AR33 of the first and/or second copy command COM30, COM31.

In FIG. 16, the "Copy source (with overlapping)" column and the "Copy destination (with overlapping)" column show the contents of the operation of the storage system 4 in the case the read area or write area specified by the read command or write command to be performed at that time includes the overlapping parts of the copy source areas AR30, AR32 or the copy destination areas AR31, AR33 of the first and second copy commands COM30, COM31.

Meanwhile, in FIG. 16, the "Copy source (without overlapping)" column and the "Copy destination (without overlapping)" column show the contents of the operation of the storage system 4 in the case the read area or write area specified by the read command or write command to be performed at that time does not include any overlapping parts of the copy source areas AR30, AR32 of the first and second copy commands COM30, COM31 or any overlapping parts of the copy destination areas AR30, AR32 of the first and second copy commands COM30, COM31.

As clearly shown in FIG. 16, if the storage system 4 performs a read command or write command and the read area or write area specified by the relevant read command or write command partially or entirely overlaps with the overlapping parts of the respective copy source areas AR30, AR32 of the first and second copy commands COM30, COM31, performs the same processing as mentioned above with reference to each of the "Copy source (with overlapping)" fields whose "#" are "1" to "4" in FIG. 12 (refer to the "Copy source (with overlapping)" fields in the rows whose "#" are "1" to "4" in FIG. 16).

Meanwhile, the storage system 4, for the cases other than those described above, performs the same processing as mentioned above with reference to FIG. 14 (refer to each of the "Copy source (with overlapping)" fields, each of the "Copy destination (with overlapping)" fields, and each of the "Copy destination (without overlapping)" fields in the rows whose "#" are "1" to "4" in FIG. 16).

(3-2-4) Fourth Operation Pattern

Figure 17:
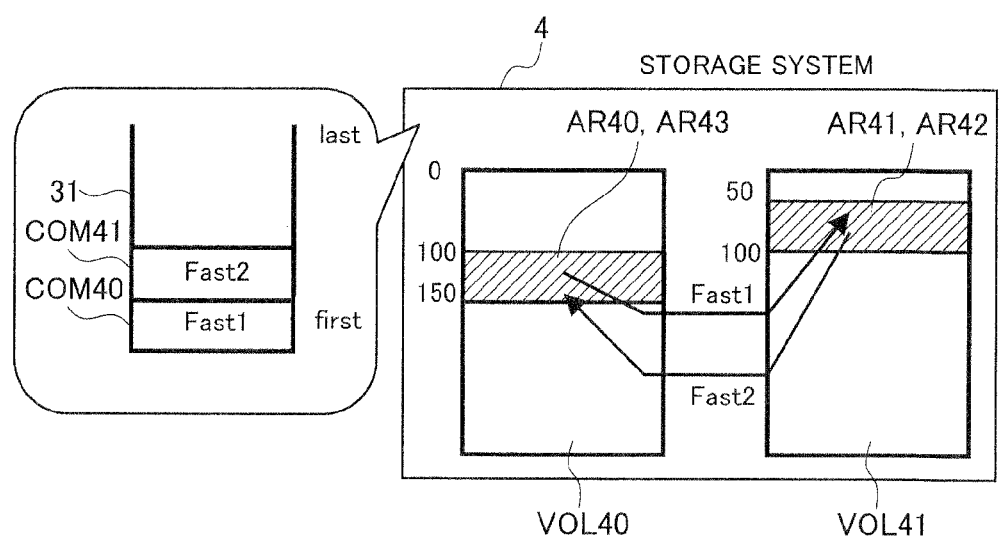
FIG. 17 is a conceptual diagram explaining an applied pattern of read/write operations.

As shown in FIG. 17, in the status the first copy command COM40 is registered to the copy queue 31, if the second copy command COM41 whose copy source area AR42 partially or entirely overlaps with the copy destination area AR41 of the first copy command 40 and whose copy destination area AR43 partially or entirely overlaps with the copy source area AR40 of the first copy command COM40 is provided from the host device 2, the storage system 4 rejects the second copy command COM41.

As mentioned above, the storage system 4, by rejecting the second copy command COM41, prevents the copy processing from entering the loop status.

(3-2-5) Fifth Operation Pattern

Figure 18:
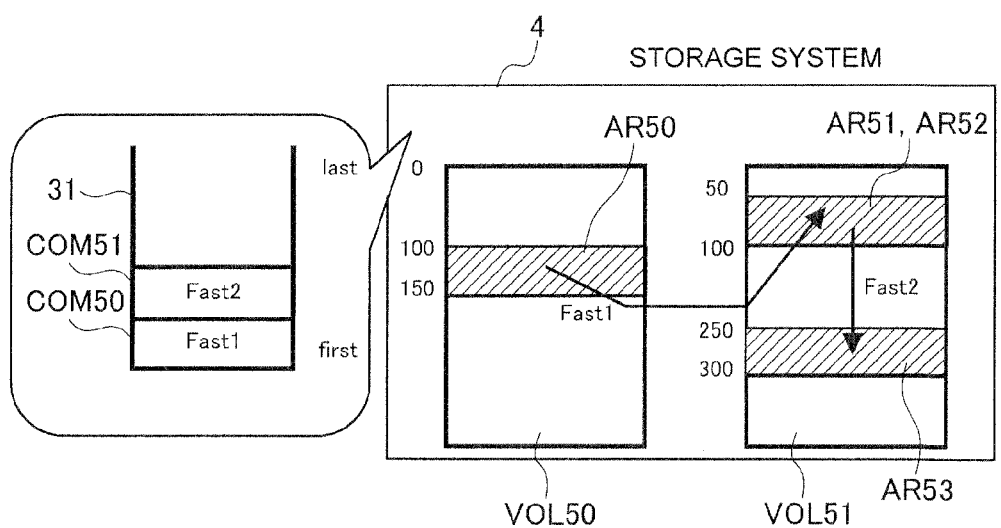
FIG. 18 is a conceptual diagram explaining an applied pattern of read/write operations.

As shown in FIG. 18, in the status the first copy command COM50 is registered to the copy queue 31, if the second copy command COM51 whose copy source area AR52 partially or entirely overlaps with the copy destination area AR51 of the first copy command COM50 is provided from the host device 2, the storage system 4 rejects the second copy command COM51.

As mentioned above, the storage system 4, by rejecting the second copy command COM51, prevents the multistage processing.

(3-2-6) Sixth Operation Pattern

Figure 19:
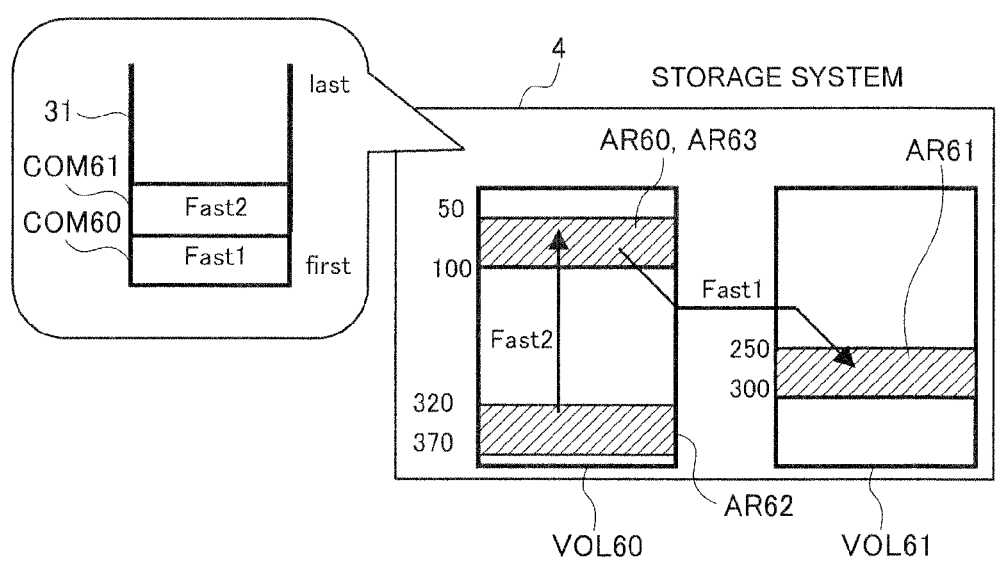
FIG. 19 is a conceptual diagram explaining an applied pattern of read/write operations.

As shown in FIG. 19, in the status the first copy command COM60 is registered to the copy queue 31, if the second copy command COM61 whose copy destination area AR63 partially or entirely overlaps with the copy source area AR60 of the first copy command COM60 is provided from the host device 2, the storage system 4 also rejects the second copy command COM61.

As mentioned above, the storage system 4, by rejecting the second copy command COM61, prevents the copy processing from entering the loop status.

(4) Concrete Contents of Processing by CPU of Storage System

Next, the concrete contents of the read processing and the write processing performed by the CPUs 22A, 22B (FIG. 1) of the relevant storage system 4 for the storage system 4 to perform the above-mentioned first to sixth patterns of processing are described below.

Figure 20:
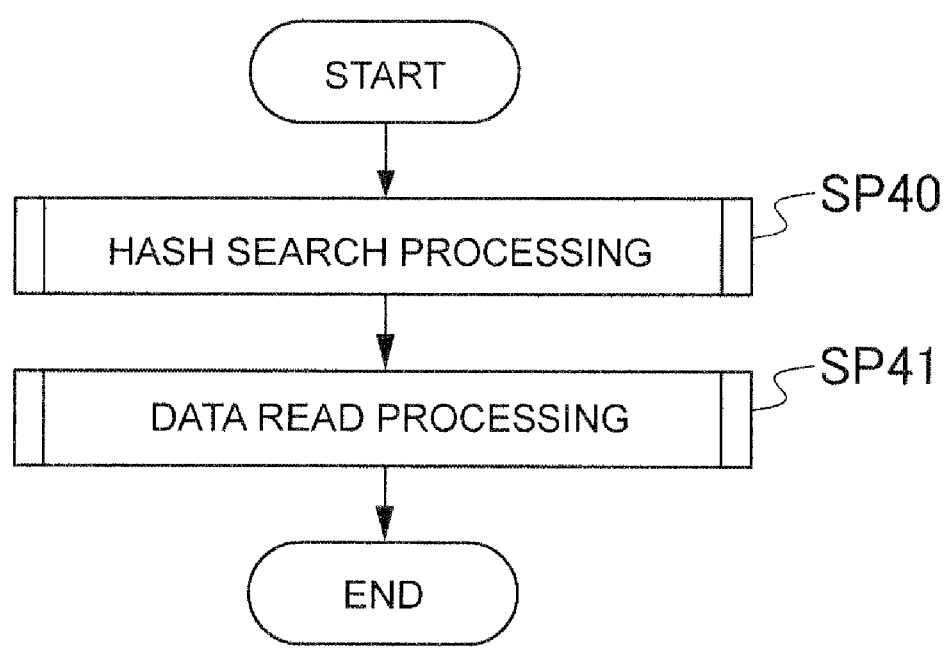
FIG. 20 is a flowchart showing the processing routine of the read processing.

(4-1) Various Types of Processing by CPU Related to Read Processing (4-1-1) Read Processing FIG. 20 shows the procedure of the read processing performed by the CPUs 22A, 22B of the storage system 4 when processing a read command stored in the command queue 30.

The CPUs 22A, 22B, when starting this read processing, firstly make the starting address of the read area specified by the read command and the length of the read area specified by the relevant read command into an argument, and determine whether the relevant read area partially or entirely overlaps with the copy source area or the copy destination area of any copy command registered to the copy queue 31 or not, by referring to the hash table 40 (FIG. 5) (SP40).

Next, the CPUs 22A, 22B, with reference to the result of the determination obtained at step SP40, control the disk devices 10 via the drive interfaces 24A, 24B, read the data stored or which should be stored in the read area specified by the read command from the disk devices 10, send the read data to the host device 2 (SP41), and complete this read processing.

(4-1-2) Hash Search Processing

Figure 21:
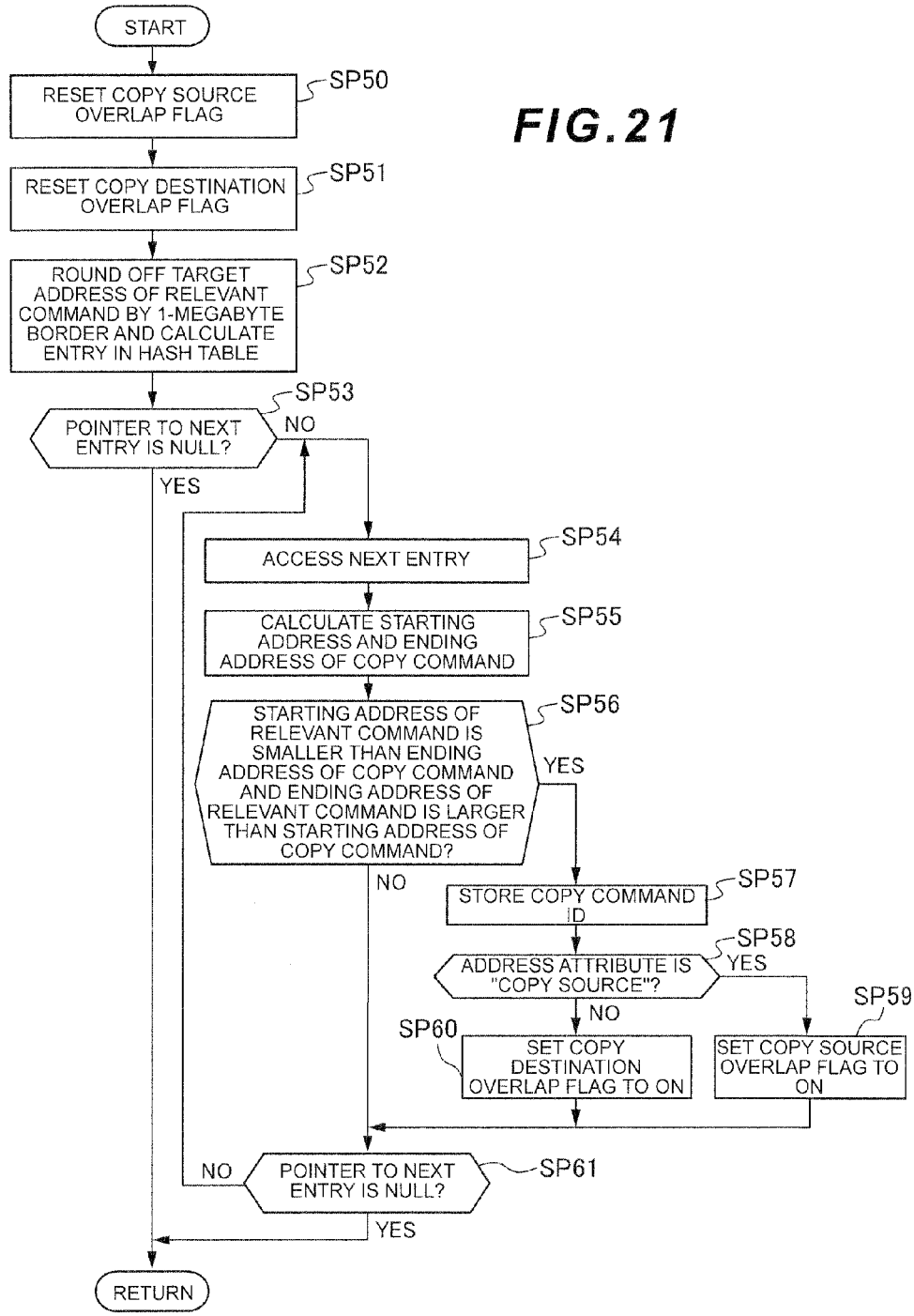
FIG. 21 is a flowchart showing the processing routine of the hash search processing.

FIG. 21 shows the concrete contents of the hash search processing performed by the CPUs 22A, 22B at step SP40 of the read processing.

The CPUs 22A, 22B, when proceeding to step SP40 of the read processing, start this hash search processing, firstly by resetting (set to OFF) the copy source overlap flag and the copy destination overlap flag maintained in the specified positions of the cache memories 23A, 23B (SP50, SP51). The copy source overlap flag shows that the read area specified by the read command partially or entirely overlaps with the copy source area of any copy command registered to the copy queue 31, and the copy destination overlap flag shows that the read area partially or entirely overlaps with the copy destination area of any copy command registered to the copy queue 31. These copy source overlap flag and the copy destination overlap flag are, as described later, used in the subsequent processing.

Next, the CPUs 22A, 22B round off the starting address of the read area specified by the read command by the 1-megabyte border and, by the remainder from the division of the result value by the number of slots in the hash table 40 (FIG. 5), detect the corresponding slots 40A to 40L (FIG. 5) in the hash table 40 (SP52).

Next, the CPUs 22A, 22B determine whether "Null" showing that there is no pointer for the next entry is stored in the slots 40A to 40L or not (SP53).

At this point, obtaining the affirmative result to this determination means that the copy command whose copy source area or copy destination area partially or entirely overlaps with the read area specified by the read command is not stored in the copy queue 31. Therefore, at this point, the CPUs 22A, 22B complete this hash search processing and return to the read processing.

Meanwhile, obtaining the negative result to this determination means that the copy command whose copy source area or copy destination area partially or entirely overlaps with the read area specified by the read command is stored in the copy queue 31. Therefore, at this point, the CPUs 22A, 22B access the entry 41 (FIG. 5) specified by the pointer stored in the slots 40A to 40L (SP54).

Next, the CPUs 22A, 22B obtain the bitmap 42 (FIG. 5) stored in the bitmap field 41B (FIG. 5) of the entry 41 accessed at step SP54 and, with reference to the obtained bitmap 42, calculate the starting address and the ending address of the storage area specified as the copy source area or the copy destination area (target area) corresponding with the entry 41 in the copy command corresponding with the entry 41 (SP55).

Next, the CPUs 22A, 22B determine whether the starting address of the read area specified by the read command is smaller than the ending address of the target area of the copy command and, at the same time, whether the ending address of the read area is larger than the starting address of the target area of the copy command or not (SP56).

Figure 22:
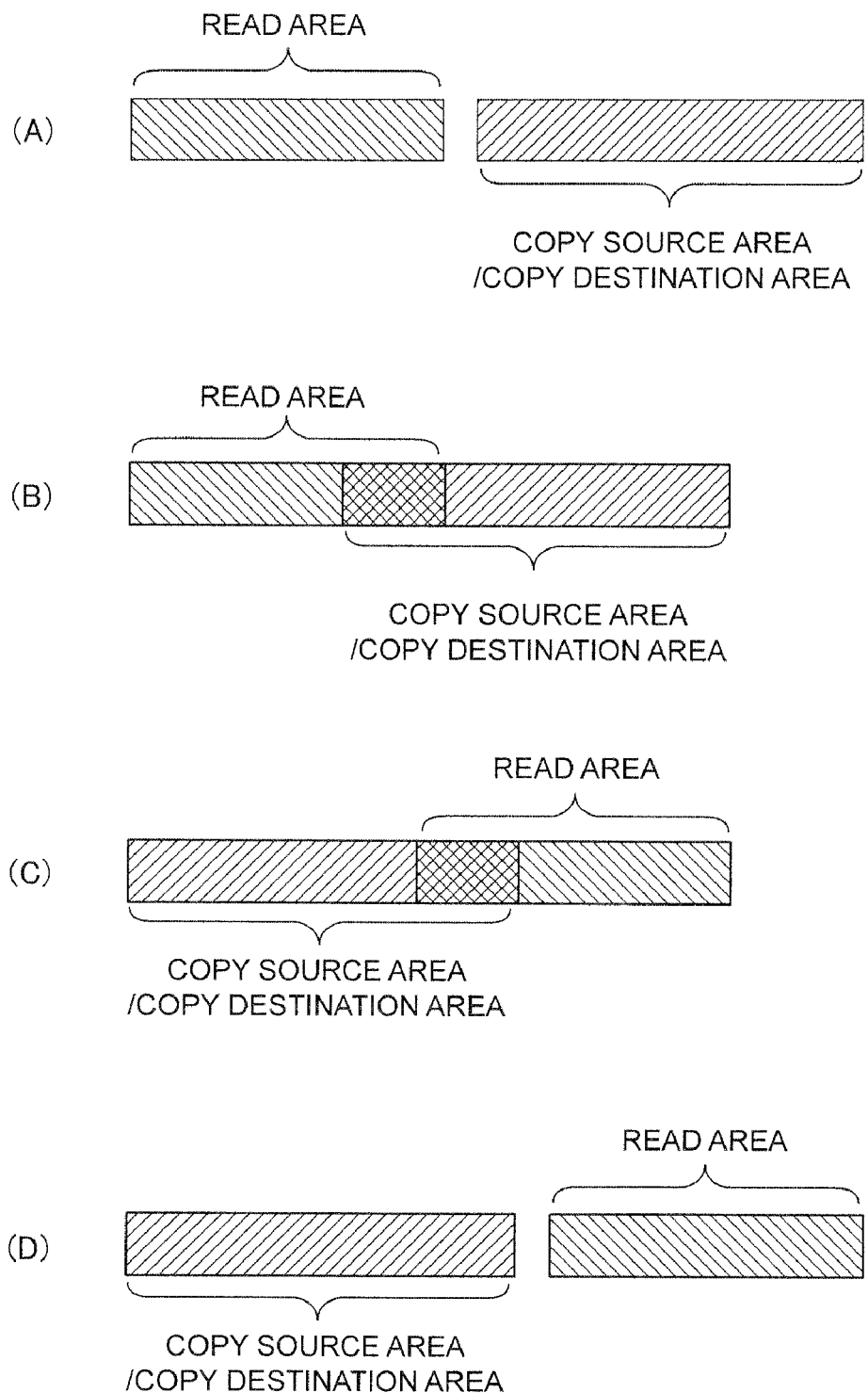
FIG. 22 is a conceptual diagram explaining the hash search processing.

Obtaining the negative result to this determination means that, as shown in FIG. 22(A) or (D), the read area and the target area of the copy command do not overlap either partially or entirely. Therefore, at this point, the CPUs 22A, 22B proceed to step SP61.

On the other hand, obtaining the affirmative result to this determination at step SP 56 means that, as shown in FIG. 22(B) or (C), the read area partially or entirely overlaps with the target area of the copy command. Therefore, at this point, the CPUs 22A, 22B obtain the command ID of the copy command corresponding with the relevant entry 41 from the copy command ID field 41A (FIG. 5) of the entry 41, and stores it (SP57).

Furthermore, the CPUs 22A, 22B refer to the address attribute field 41C (FIG. 5) of the entry 41 and determine whether the address attribute stored in the relevant address attribute field 41C is "Copy source" or not (whether the entry 41 corresponds with the copy source area of the copy command or not) (SP58).

The CPUs 22A, 22B, if obtaining the affirmative result to this determination, set the copy source overlap flag reset at step SP50 to ON (SP59), and then proceed to step SP61. On the other hand, the CPUs 22A, 22B, if obtaining the negative result to this determination, set the copy destination overlap flag reset at step SP51 to ON (SP60), and then proceed to step SP61.

The CPUs 22A, 22B proceed to step SP61, refers to the pointer field 41D (FIG. 5) of the entry 41, and determine whether "Null" is stored or not (SP61).

The CPUs 22A, 22B, if obtaining the negative result to this determination, return to step SP54, and then perform the same processing as mentioned above. On the other hand, the CPUs 22A, 22B, if obtaining the affirmative result to this determination, complete this hash search processing and return to the read processing.

(4-1-3) Data Read Processing

Figure 23:
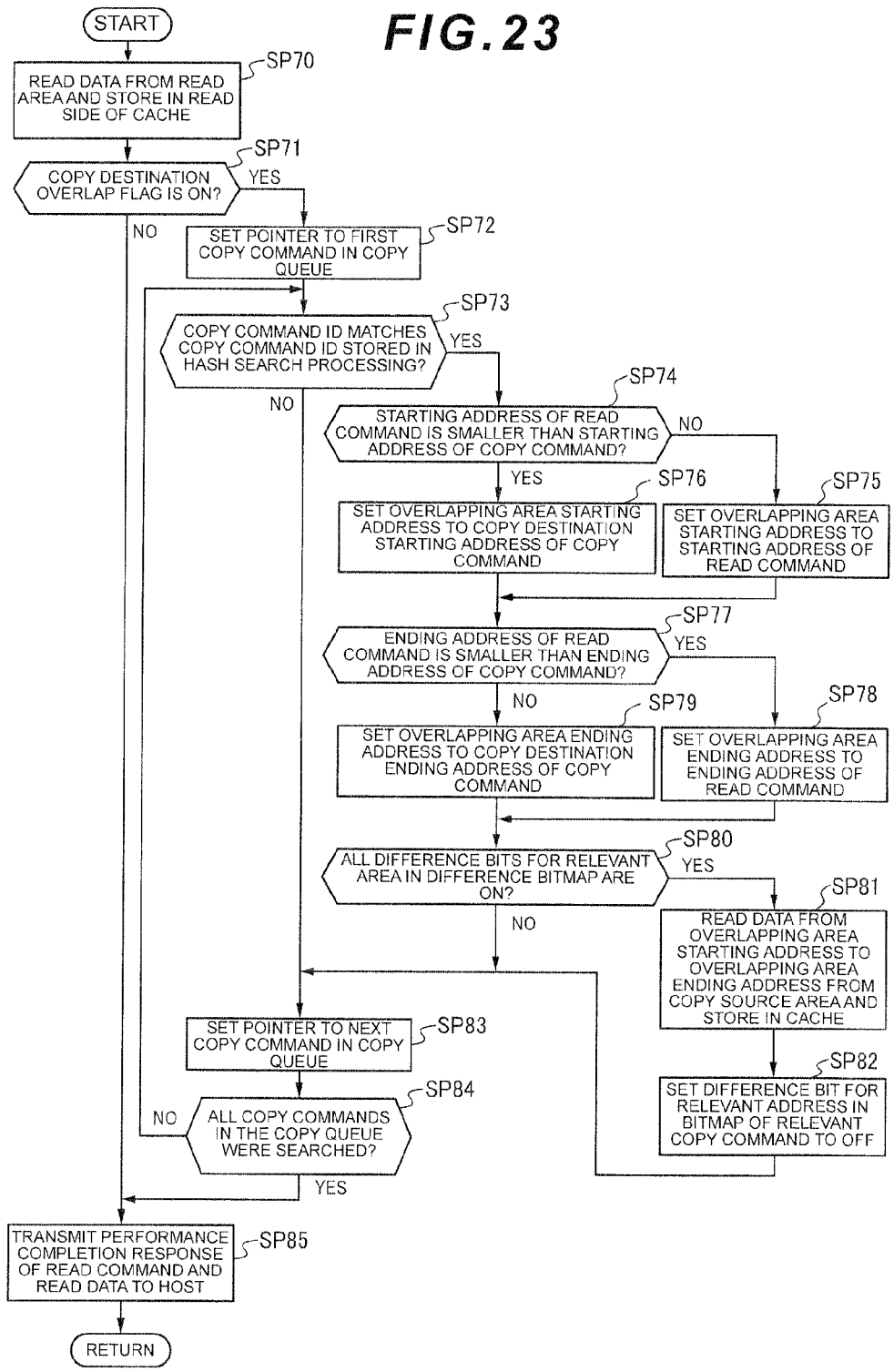
FIG. 23 is a flowchart showing the processing routine of the data read processing.

On the other hand. FIG. 23 shows the concrete contents of the data read processing performed by the CPUs 22A, 22B at step SP41 of the read processing explained with reference to FIG. 20.

The CPUs 22A, 22B proceed to step SP41 of the read processing and start this data read processing. Firstly, by controlling the corresponding disk devices 10 via the drive interfaces 24A, 24B, [the CPUs 22A, 22B] read data from the read area specified by the read command, and store the read data in the read sides of the cache memories 23A, 23B (SP70).

Next, the CPUs 22A, 22B determine whether the copy destination overlap flag mentioned above for step SP51 of FIG. 21 is set to ON or not (SP71) and, if it obtains the negative result, proceed to step SP85.

On the other hand, the CPUs 22A, 22B, if obtaining the affirmative result to the determination at step SP71, set a pointer (hereinafter referred to as a copy command pointer) for the copy command to be performed first of the copy commands registered to the copy queue 31 (SP72), and then determine whether the copy command ID of the copy command for which the copy command pointer was set matches the copy command ID stored at step SP57 in FIG. 21 or not (SP73).

The CPUs 22A, 22B, if obtaining the negative result to this determination, proceed to step SP83 or, on the other hand, if obtaining the affirmative result, determine whether the starting address of the read area specified by the read command is smaller than the starting address of the target area of the copy command for which the copy command pointer is set at that time or not (SP74).

The CPUs 22A, 22B, if obtaining the negative result to this determination, set the starting address of the read area specified by the read command as the starting address of the area (hereinafter referred to as an overlapping area starting address) where the read area specified by the read command overlaps with the target area of the copy command (SP75) or, if obtaining the affirmative result, set the starting address of the target area of the copy command as the overlapping area starting address (SP76).

Next, the CPUs 22A, 22B determine whether the ending address of the read area specified by the read command is smaller than the ending address of the target area of the copy command or not (SP77).

The CPUs 22A, 22B, if obtaining the affirmative result to this determination, set the ending address of the read area specified by the read command as the ending address of the overlapping area (hereinafter referred to as an overlapping area ending address) (SP78) or, if obtaining the negative result, set the ending address of the target area of the copy command as the overlapping area ending address (SP79).

Next, the CPUs 22A, 22B determine whether each difference bit corresponding with the overlapping area in the difference bitmap 32 (FIG. 2) corresponding with the copy command for which the copy command pointer is set at that time is set to ON or not (SP80).

The CPUs 22A, 22B, if obtaining the negative result to this determination, proceed to step SP83 or, if obtaining the affirmative result, read the data stored in the storage area from the overlapping area starting address set at step SP75 or at step SP76 in the copy source area of the copy command to the overlapping area ending address set at step SP78 or at step SP79, and overwrite the corresponding data part of the data stored on the read sides of the cache memories 23A, 23B at step SP70 with the read data.

Next, the CPUs 22A, 22B set the difference bit corresponding with the data read at step SP81 in the difference bitmap 32 (FIG. 2) corresponding with the copy command to OFF (SP82), and then proceed to step SP83.

Next, the CPUs 22A, 22B proceed to step SP83, and move the copy command pointer mentioned above for step SP72 to the copy command to be performed after the copy command for which the copy command pointer is set at that point of the copy commands registered to the copy queue 31 (SP83). Then, the CPUs 22A, 22B determine whether the processing from step SP73 to step SP83 were performed for all the copy commands registered to the copy queue 31 (SP84).

The CPUs 22A, 22B, if obtaining the negative result to this determination, return to step SP73 and repeat the processing from step SP73 to step SP83 until it obtains the affirmative result at step SP84. The CPUs 22A, 22B, if obtaining the affirmative result by completing the processing from step SP73 to step SP83 for all the copy commands registered to the copy queue 31 in due course at step SP84, send the performance completion response of the relevant read command and the read data stored in the read sides of the cache memories 23A, 23B at that time to the host device 2 as the sending source of the read command (SP85), and then return to the read processing in FIG. 20.

(4-2) Various Types of Processing by CPU Related to Write Processing

(4-1-1) Write Processing

Figure 24:
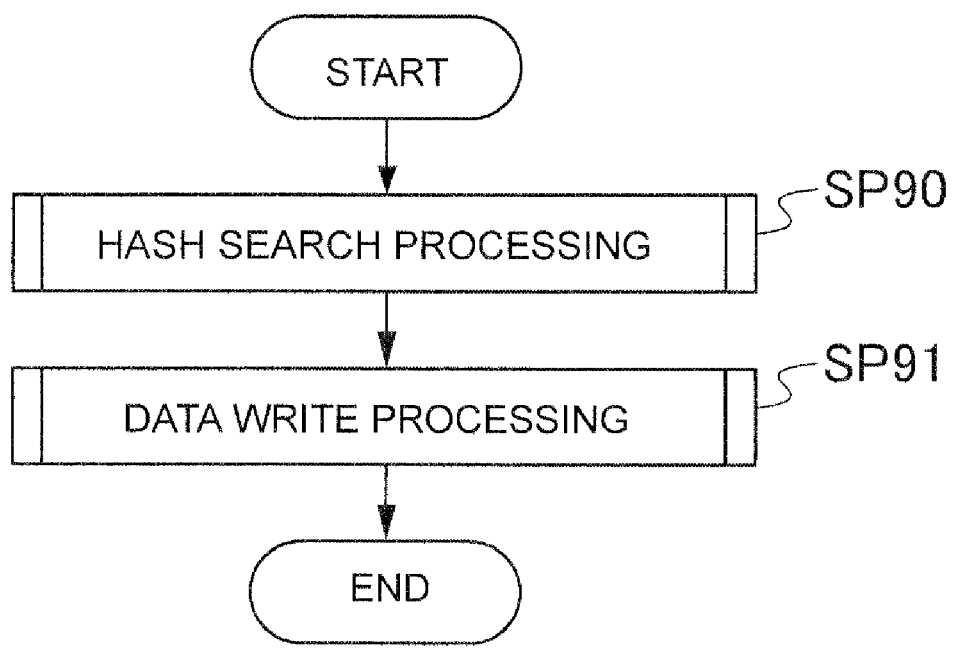
FIG. 24 is a flowchart showing the processing routine of the write processing.

On the other hand. FIG. 24 shows the procedure of the write processing performed by the CPUs 22A, 22B of the storage system 4 when processing a write command stored in the command queue 30.

The CPUs 22A, 22B, when starting this write processing, firstly make the starting address of the write area specified by the write command and the length of the write area specified by the relevant write command into an argument, and determine whether the write area partially or entirely overlaps with the copy source area or the copy destination area of any copy command registered to the copy queue 31 or not, by referring to the hash table 40 (FIG. 5) (SP90). As more specifically described, at this step SP90, the CPUs 22A, 22B perform the hash search processing explained with reference to FIG. 21.

Next, the CPUs 22A, 22B, with reference to the result of the determination obtained at step SP90, control the disk devices 10 (FIG. 1) via the drive interfaces 24A, 24B (FIG. 1), store the write data in the write area specified by the write command from the disk devices 10 (SP91), and then complete this write processing.

(4-2-2) Data Write Processing

Figure 25A:
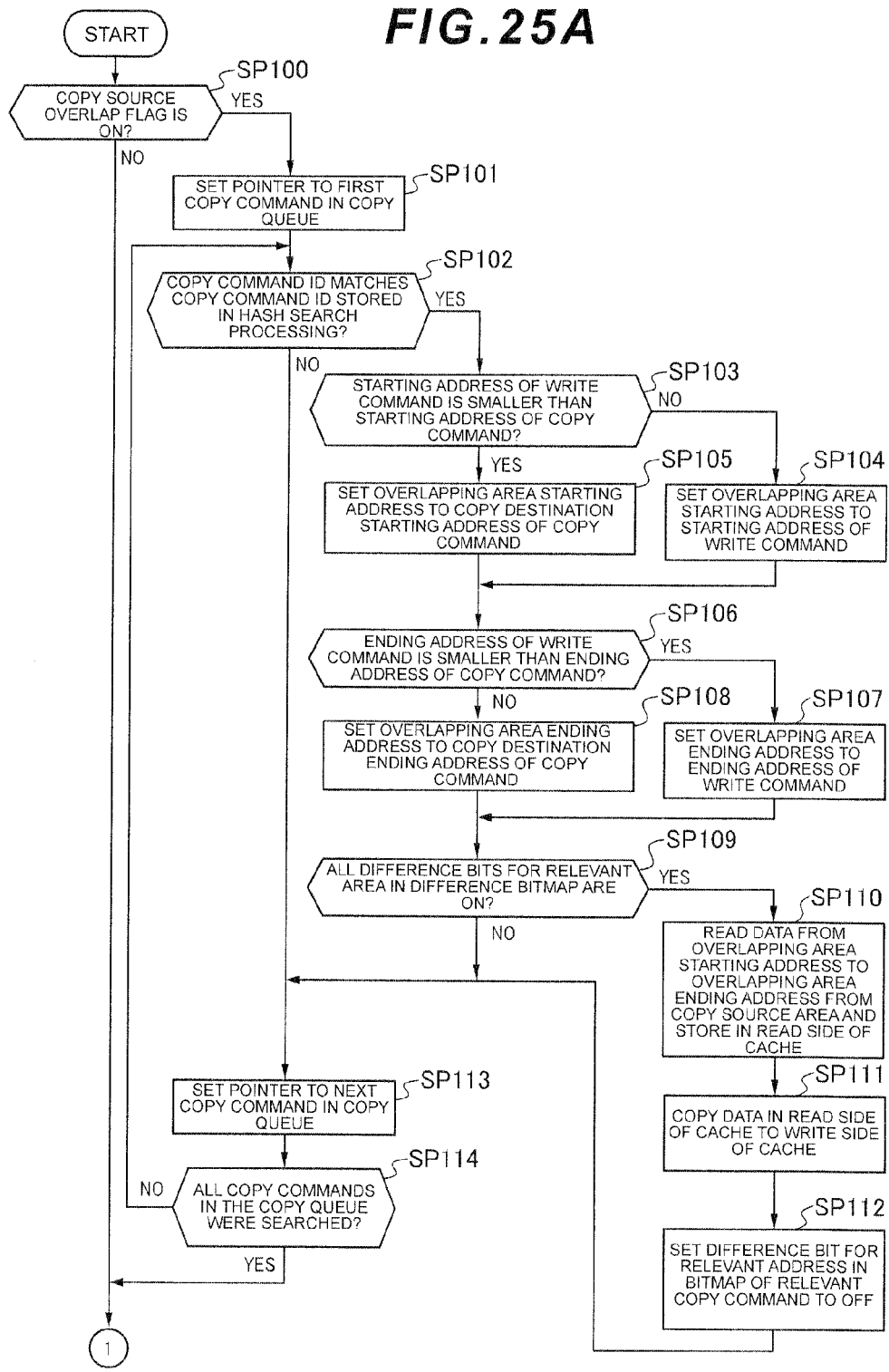
FIG. 25A is a flowchart showing the processing routine of the data write processing.
Figure 25B:
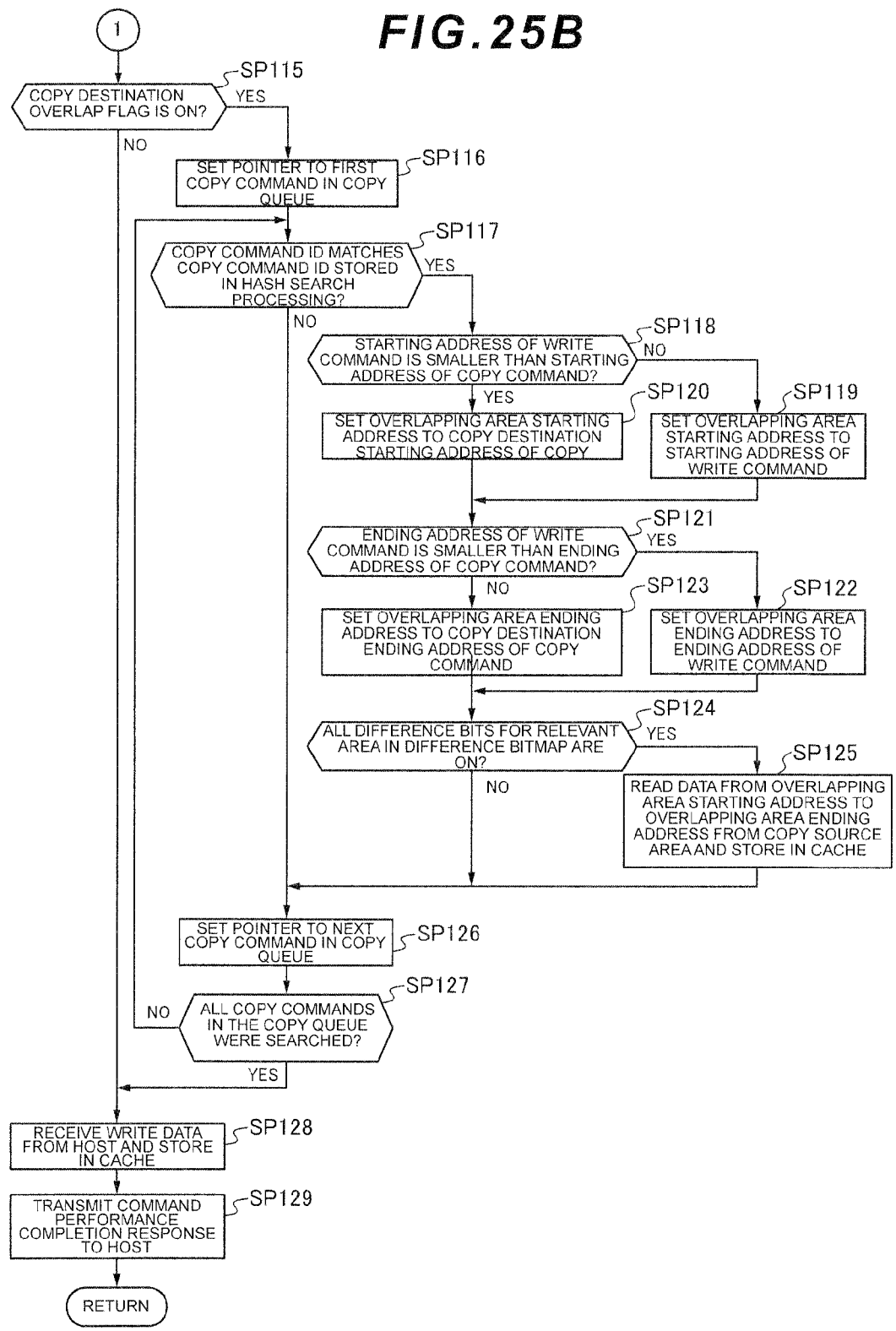
FIG. 25B is a flowchart showing the processing routine of the data write processing.

FIG. 25A and FIG. 25B show the concrete contents of the data write processing performed by the CPUs 22A, 22B at step SP91 of the write processing.

The CPUs 22A, 22B proceed to step SP91 of the write processing and start this data write processing by determining whether the copy source overlap flag mentioned above for step SP50 of FIG. 21 is set to ON or not (SP100). Then, the CPUs 22A, 22B, if obtaining the negative result to this determination, proceed to step SP114.

On the other hand, the CPUs 22A, 22B, if obtaining the affirmative result to the determination at step SP100, set a copy command pointer for the copy command to be performed first of the copy commands registered to the copy queue 31 (SP101), and then determine whether the copy command ID of the copy command for which the copy command pointer was set matches the copy command ID stored at step SP57 in FIG. 21 or not (SP102).

The CPUs 22A, 22B, if obtaining the negative result to this determination, proceed to step SP113 or, on the other hand, if obtaining the affirmative result, determine whether the starting address of the write area specified by the write command is smaller than the starting address of the target area of the copy command for which the copy command pointer is set at that time or not (SP103).

The CPUs 22A, 22B, if obtaining the negative result to this determination, set the starting address of the read area specified by the write command as the starting address of the area (overlapping area starting address) where the write area specified by the write command overlaps with the target area of the copy command (SP104) or, if obtaining the affirmative result, set the starting address of the target area of the copy command as the overlapping area starting address (SP105).

Next, the CPUs 22A, 22B determine whether the ending address of the write area specified by the write command is smaller than the ending address of the target area of the copy command (SP106).

The CPUs 22A, 22B, if obtaining the affirmative result to this determination, set the ending address of the write area specified by the write command as the ending address of the overlapping area (overlapping area ending address) (SP107) or, if obtaining the negative result, set the ending address of the target area of the copy command as the overlapping area ending address (SP108).

Next, the CPUs 22A, 22B determine whether each difference bit corresponding with the overlapping area in the difference bitmap 32 corresponding with the copy command for which the copy command pointer is set at that time is set to ON or not (SP109).

The CPUs 22A, 22B, if obtaining the negative result to this determination, proceed to step SP113 or, if obtaining the affirmative result, by controlling the corresponding disk devices 10, read the data stored in the storage area from the overlapping area starting address set at step SP104 or at step SP105 in the copy source area of the copy command to the overlapping area ending address set at step SP107 or at step SP108, and store the read data on the read sides of the cache memories 23A, 23B (SP110).

Furthermore, the CPUs 22A, 22B copy the data stored in the read sides of the cache memories 23A, 23B to the write sides of the cache memories 23A, 23B (SP111), and then set the difference bit corresponding with the data read from the disk devices 10 at step SP110 in the difference bitmap 32 corresponding with the copy command to OFF (SP112), and proceed to step SP113.

Next, the CPUs 22A, 22B proceed to step SP113, and move the copy command pointer mentioned above for step SP101 to the copy command to be performed after the copy command for which the copy command pointer is set at that point (SP113).

Then, the CPUs 22A, 22B determine whether the processing from step SP102 to step SP113 were performed for all the copy commands registered to the copy queue 31 or not (SP114).

The CPUs 22A, 22B, if obtaining the negative result to this determination, return to step SP102 and repeat the processing from step SP102 to step SP114 until obtaining the affirmative result at step SP114. The CPUs 22A, 22B, if obtaining the affirmative result by completing the processing from step SP102 to step SP113 for all the copy commands registered to the copy queue 31 in due course at step SP114, proceed to step SP115.

The CPUs 22A, 22B, when proceeding to step SP115, determine whether the copy destination overlap flag mentioned above for step SP51 of FIG. 21 is set to ON or not (SP115) and, if obtaining the negative result, proceed to step SP128.

On the other hand, the CPUs 22A, 22B, if obtaining the affirmative result to the determination at step SP115, subsequently, perform the processing from step SP116 to step SP127 by the same method as the processing from step SP101 to step SP114. Then, the CPUs 22A, 22B, when obtaining the affirmative result at step SP127 in due course, proceed to step SP128.

The CPUs 22A, 22B, when proceeding to step SP128, receive the write data sent along with the write command from the host device 2, and store this write data on the write sides of the cache memories 23A, 23B (SP128).

In this case, the CPUs 22A, 22B, as explained with reference to FIG. 10 for example, if the data copied on the write sides of the cache memories 23A, 23B at step SP111 must be overwritten with the write data sent from the host device 2, overwrite the relevant data with the write data.

The CPUs 22A, 22B send the performance completion response of the relevant write command to the host device 2 as the sending source of the write command (SP129), and return to the write processing in FIG. 24.

(4-3) Copy Command Reception Processing

Figure 26:
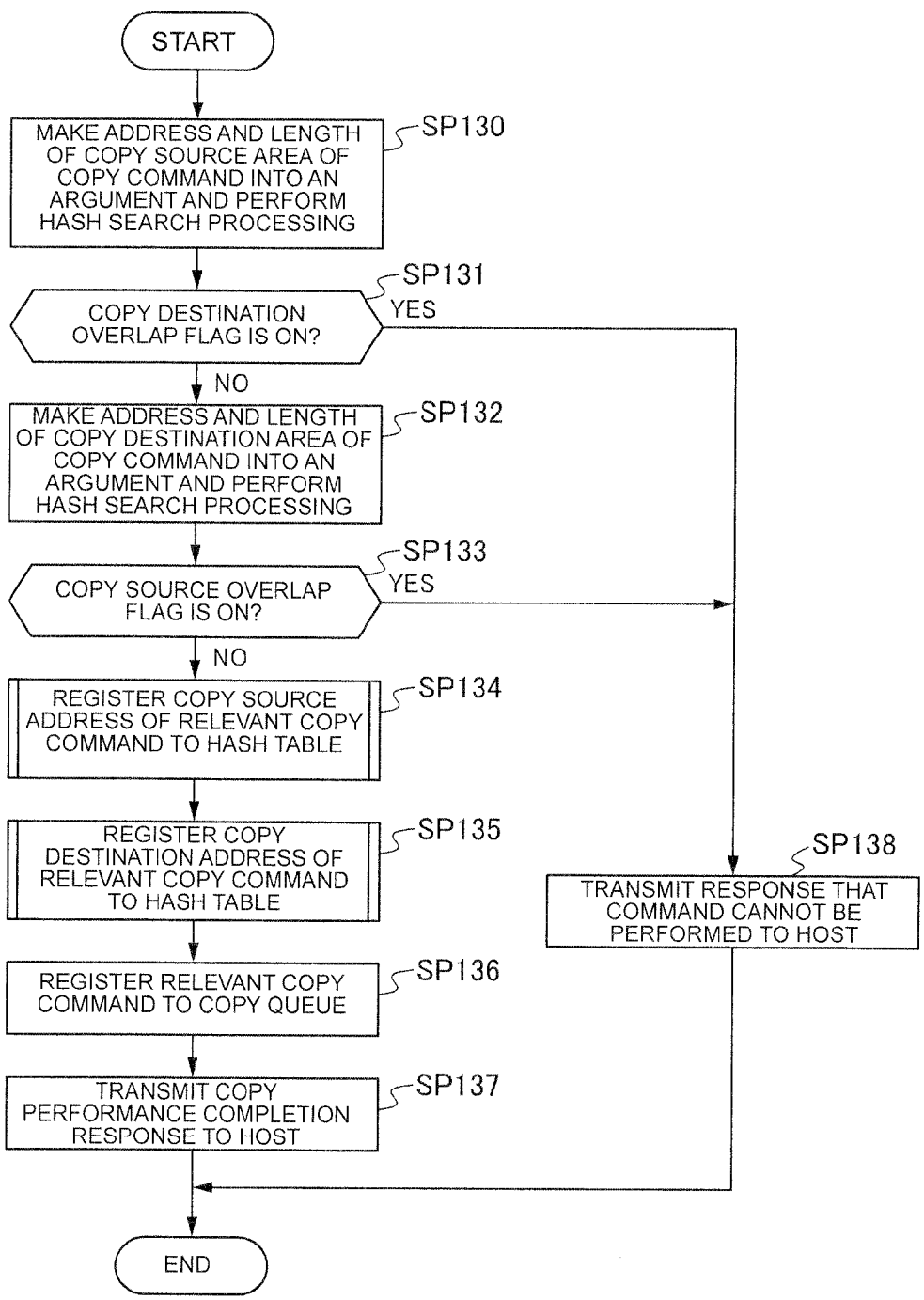
FIG. 26 is a flowchart showing the processing routine of the copy command processing.

On the other hand, FIG. 26 shows the concrete processing routine of the CPUs 22A, 22B of the storage system 4 in the case [the CPUs 22A, 22B] receive a copy command from the host device 2.

The CPUs 22A, 22B, when receiving a copy command from the host device 2, start the reception processing of this copy command. Firstly, [the CPUs 22A, 22B] make the starting address of the copy source area of the copy command and the length of the copy source area specified by the relevant copy command into an argument, and determine whether the copy source area overlaps with the copy destination area or the copy source area of any copy command registered to the copy queue 31 or not, by referring to the hash table 40 (FIG. 5) (SP130). As more specifically described, at this step SP130, the CPUs 22A, 22B perform the hash search processing explained with reference to FIG. 21.

Next, the CPUs 22A, 22B determine whether the copy source overlap flag mentioned above for step SP50 of FIG. 21 is set to ON or not (SP131).

At this point, obtaining the affirmative result to this determination, as explained with reference to FIG. 17 and FIG. 19, means that the copy source area of the copy command received at that time partially or entirely overlaps with the copy destination area of any of the copy commands already registered to the copy queue 31. Therefore, at this point, the CPUs 22A, 22B send the error response that the relevant copy command cannot be performed to the host device 2 as the sending source of the copy command (SP138), and then complete this copy command reception processing.

Meanwhile, the CPUs 22A, 22B, if obtaining the negative result to this determination at step SP131 make the starting address of the copy destination area of the copy command received at that time and the length of the copy destination area specified by the relevant copy command into an argument, and determine whether the copy destination area partially or entirely overlaps with the copy source area of any copy command registered to the copy queue 31 or not, by referring to the hash table 40 (SP132). As more specifically described, at this step SP132, the CPUs 22A, 22B perform the hash search processing explained with reference to FIG. 21.

Next, the CPUs 22A, 22B determine whether the copy destination overlap flag mentioned above for step SP51 of FIG. 21 is set to ON or not (SP133).

At this point, obtaining the affirmative result to this determination, as explained with reference to FIG. 18, means that the copy destination area of the copy command received at that time partially or entirely overlaps with the copy source area of any of the copy commands already registered to the copy queue 31. Therefore, at this point, the CPUs 22A, 22B send the error response that the relevant copy command cannot be performed to the host device 2 as the sending source of the copy command (SP138), and then complete this copy command reception processing.

On the other hand, obtaining the negative result to this determination at step SP133 means that the copy destination area of the copy command received at that time does not overlap with the copy source area of any of the copy commands already registered to the copy queue 31. Therefore, at this point, the CPUs 22A, 22B register the copy source area and the copy destination area of the copy command to the hash table 40 (FIG. 5) respectively (SP134, SP135), and register the copy command to the copy queue 31 (SP136).

Next, the CPUs 22A, 22B send the response (copy performance completion response) that the copy processing in accordance with the relevant copy command is completed to the host device 2 as the sending source of the copy command (SP137), and then complete this copy command reception processing.

(4-4) Hash Table Registration Processing

Figure 27:
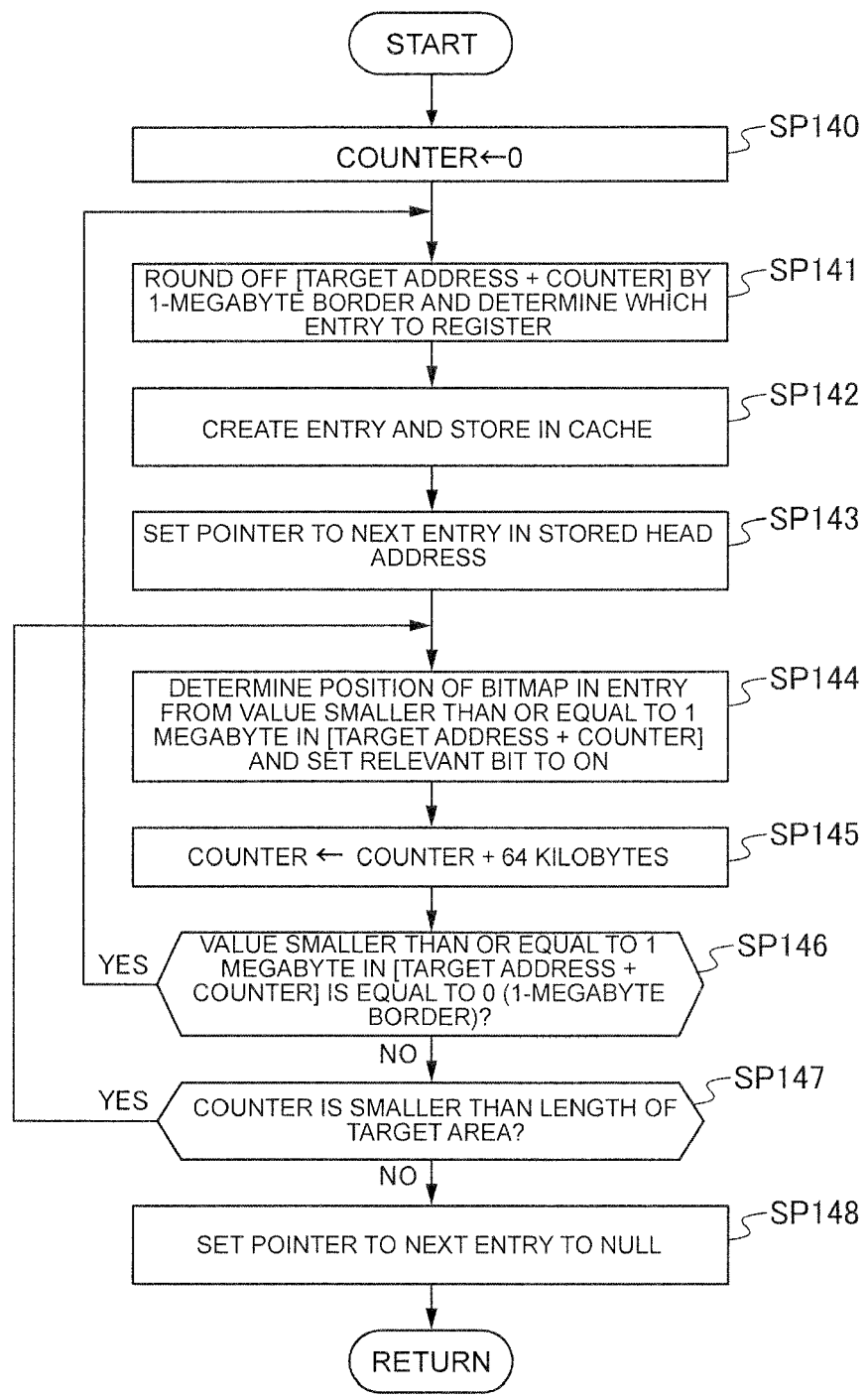
FIG. 27 is a flowchart showing the processing routine of the hash table registration processing.

On the other hand, FIG. 27 shows the concrete contents of the hash table registration processing performed at step SP134 and at step SP135 of the copy command reception processing explained with reference to FIG. 26.

The CPUs 22A, 22B, when proceeding to step SP 134 or step SP135, start this hash table registration processing. Firstly, the CPUs 22A, 22B reset the counter (hereinafter referred to as an address counter) not shown in the figure for counting addresses as described later (set the count value to "0") (SP140).

Next, the CPUs 22A, 22B, by rounding off the address of the starting address of the copy source area specified by the copy command which is targeted at that time (in the case of step SP134 in FIG. 26) or the starting address of the copy destination area (in the case of step SP135 in FIG. 26) with the counter value of the address counter added to it by the 1-megabyte border, determine a part of the area of the target area (copy source area or copy destination area) to be registered to the hash table 40 (FIG. 5) (SP141).

Next, the CPUs 22A, 22B create an entry 41 of the area determined at step SP141. As more specifically described, an entry 41 is created by storing the copy command ID allocated to the corresponding copy command in the copy command ID field 41A (FIG. 5), storing the bitmap 42 (FIG. 5) whose bit corresponding with the area is set to ON in the bitmap field 41B (FIG. 5), and storing the address attribute (copy source area or copy destination area) in the address attribute field 41C (FIG. 5). Then, the CPUs 22A, 22B store the entry 41 created as mentioned above in the cache memories 23A, 23B (SP142).

Next, the CPUs 22A, 22B set a pointer for the entry 41 created at step SP142 (hash pointer) in the corresponding slots 40A to 40L in the hash table 40 or in the pointer field 41D (FIG. 5) of the last entry 41 of the entries 41 made to correspond with the slots 40A to 40L (SP143).

Next, the CPUs 22A, 22B, with reference to the value smaller than or equal to 1 megabyte among the value of the target area starting address with the count value of the address counter added to it, set the bit corresponding with the 64-kilobyte unit area which is targeted at that time in the bitmap 42 stored in the bitmap field 41B of the entry 41 to ON (SP144).

Furthermore, the CPUs 22A, 22B add a 64-kilobyte numeral value to the count value of the address counter (SP145), and then determine whether the value smaller than or equal to 1 megabyte among the value of the target area starting address with the count value of the address counter added to it has become "0" or not (SP146).

At this point, obtaining the negative result to this determination means that the 64-kilobyte unit area which is targeted at that time is not the last unit area of the 1-megabyte border. Therefore, at this time, the CPUs 22A, 22B determine whether the count value of the address counter is smaller than the length of the target area of the copy command which is targeted at that time or not (SP147).

The CPUs 22A, 22B, if obtaining the negative result to this determination, return to step SP144, and repeat the processing from step SP144 to step SP147 until obtaining the affirmative result at step SP146 or step SP147. By this processing, the CPUs 22A, 22B, for each of the unit areas in the 1-megabyte area which is targeted at that time, sequentially set the corresponding bits in the bitmap 42 stored in the bitmap field 41B of the entry 41 to ON.

The CPUs 22A, 22B, if obtaining the affirmative result at step SP146 by completing the same processing in due course for all the unit areas in the 1-megabyte area which is targeted at that time, return to step SP141, and then repeat the same processing for the next 1-megabyte area (SP141 to SP147).

The CPUs 22A, 22B, if obtaining the negative result at step SP147 by completing the same processing in due course for all the 1-megabyte areas in the target areas of the copy command which is targeted at that time, set "Null" indicating that there is no more entry in the pointer field 41D of the entry 41 (SP148), and then complete this hash table registration processing.

(5) Advantageous Effects of this Embodiment

As mentioned above, in the storage system 4 of this embodiment, the copy queue 31 is provided in addition to the command queue 30 and, if the command stored in the command queue 30 is a copy command, moves the command to the copy queue 31, sends the copy performance completion response to the host device 2 as the sending source of the copy command, and then performs the copy processing in accordance with the copy command in the background. By this method, in the host device 2, the subsequent commands to access the same address are not made to wait, which prevents the occurrence of time-out in advance. Therefore, the highly reliable storage system capable of accelerating the processing speed of the copy processing seen from the host device can be achieved.

(6) Other Embodiments

Note that, though the above-mentioned embodiment discloses the case where this invention is applied to the storage system 4 configured as in FIG. 1, this invention is not limited to the case but may also be broadly applied to other various types of storage systems.

Furthermore, though the above-mentioned embodiment discloses the case where the copy queue 31 (FIG. 2) is set in the cache memories 23A, 23B, this invention is not limited to the case but it may also be permitted to set [the copy queue 31] in other than the cache memories 23A, 23B, e.g. in the local memories 21A, 21B.

Furthermore, though the above-mentioned embodiment discloses the case where the number of slots in the hash table 40 (FIG. 5) is 12, this invention is not limited to the case but the number of slots other than 12 may also be permitted.

Furthermore, though the above-mentioned embodiment discloses the case where, as the control unit which stores the commands given from the host device 2 in the command queue 30 and also performs the commands stored in the command queue 30 in order of storage in the command queue 30, the CPUs 22A, 22B managing the operation control of the entire storage system 4, this invention is not limited to the case but it may also be permitted to provide the hardware with the function as the control unit separately from the CPUs 22A, 22B.

INDUSTRIAL APPLICABILITY

This invention can be broadly applied to storage systems of various types of configurations in which the copy function is installed.

The invention claimed is:

1. A storage system, comprising:
a memory set with a command queue for temporarily retaining one or more commands from a host device; and
a control unit for storing the commands issued from the host device in the command queue, and executing the commands stored in the command queue in the order that the commands were stored in the command queue,
wherein the control unit is configured to:
set a copy queue for temporarily retaining one or more copy commands from among the commands issued from the host device in the memory;
move copy commands including, among the commands from the host device stored in the command queue to the copy queue, the copy commands including a first copy command for copying data from a first storage area to a second storage area and a second copy command for copying data from a third storage area to a fourth storage area, each of the first storage area and the second storage area including a first plurality of storage regions, and each of the third storage area and the fourth storage area including a second plurality of storage regions;
generate first management information and second management information, the first management information managing whether or not data has been copied according to the first copy command for each of the first plurality of storage regions included in the first storage area and the second storage area, the second management information managing whether or not data has been copied according to the second copy command for each of the second plurality of storage regions included in the third storage area and the fourth storage area;
send, after generating the first management information, an execution completion reply of copy processing to the host device as a sender of the first copy command, in response to the first copy command;
send, after generating the second management information, an execution completion reply of copy processing to the host device as the sender of the second copy command, in response to the second copy command; and
execute, in the background, the copy commands that were moved to the copy queue in the order that the copy commands were stored in the copy queue,
wherein if the control unit receives the second copy command after receiving the first copy command, and receives a write command to write to at least one storage region in the second storage area where data has not been copied based on the first management information and the second management information, the control unit is configured to:
determine whether or not the at least one storage region is also included in the fourth storage area;
if the at least one storage region is not included in the fourth storage area, write, after copying data from the first storage area to the at least one storage region according to the first copy command, data to the at least one storage region according to the write command, and update the first management information; and
if the at least one storage region is not-included in the fourth storage area, write, after copying data from the fourth storage area to the at least one storage region according to the second copy command, data to the at least one storage region according to the write command, and update the first management information and the second management information, without copying data from the first storage area to the at least one storage region according to the first copy command.

2. The storage system according to claim 1, wherein, upon executing a read command or a write command stored in the command queue, the control unit determines whether a copy command designating an area which partially or entirely overlaps with a read area or a write area designated in the read command or the write command as a copy source or a copy destination is stored in the copy queue, and executes read processing or write processing according to a result of the determination.

3. The storage system according to claim 2, further comprising:
a hash table including a plurality of slots,
wherein, upon receiving the copy command from the host device, the control unit associates a slot of the plurality of slots with a copy source area or a copy destination area of the copy command according to a starting address of the copy source area or the copy destination area in the hash table, and
uses the hash table to determine whether a copy command designating an area which partially or entirely overlaps with a read area or a write area designated in the read command or the write command as a copy source or a copy destination is stored in the copy queue.

4. The storage system according to claim 2, wherein, upon executing a read command stored in the command queue, if a copy command designating an area which partially or entirely overlaps with a read area designated in the read command as a copy destination is stored in the copy queue and copy to an area in which the read area and the copy destination area of the copy command overlap has not yet been executed, the control unit copies data from a copy source area of the copy command to the overlapping area and thereafter reads data.

5. The storage system according to claim 2, wherein, upon executing a write command stored in the command queue, if a copy command designating an area which partially or entirely overlaps with a write area designated in the write command as a copy source is stored in the copy queue and copy to an area in which the write area and the copy source area of the copy command overlap has not yet been executed, the control unit saves data stored in the overlapping area and thereafter writes write data.

6. The storage system according to claim 2, wherein, upon executing a write command stored in the command queue, if a copy command designating an area which partially or entirely overlaps with a write area designated in the write command as a copy destination is stored in the copy queue and copy to an area in which the write area and the copy destination area of the copy command overlap has not yet been executed, the control unit copies data stored in a copy source area of the copy command to the overlapping area and thereafter writes write data.

7. A control method of a storage system, the storage system having a control unit which stores one or more commands issued from a host device in a command queue and executes the commands stored in the command queue in the order that the commands were stored in the command queue, the method comprising:
- setting a copy queue for temporarily retaining one or more copy commands from among the commands issued from the host device in the memory;
- moving copy commands including, among the commands from the host device stored in the command queue to the copy queue, the copy commands including a first copy command for copying data from a first storage area to a second storage area and a second copy command for copying data from a third storage area to a fourth storage area, each of the first storage area and the second storage area including a first plurality of storage regions, and each of the third storage area and the fourth storage area including a second plurality of storage regions;
- generating first management information and second management information, the first management information managing whether or not data has been copied according to the first copy command for each of the first plurality of storage regions included in the first storage area and the second storage area, the second management information managing whether or not data has been copied according to the second copy command for each of the second plurality of storage regions included in the third storage area and the fourth storage area;
- sending, after generating the first management information, an execution completion reply of copy processing to the host device as a sender of the first copy command, in response to the first copy command;
- sending, after generating the second management information, an execution completion reply of copy processing to the host device as the sender of the second copy command, in response to the second copy command; and
- executing, in the background, the copy commands that were moved to the copy queue in the background in the order that the copy command was stored in the copy queue,
- wherein if the control unit receives the second copy command after receiving the first copy command, and receives a write command to write to at least one storage region in the second storage area where data has not been copied based on the first management information and the second management information, the control unit is configured to perform steps of:
- determining whether or not the at least one storage region is also included in the fourth storage area;
- if the at least one storage region is not included in the fourth storage area, writing, after copying data from the first storage area to the at least one storage region according to the first copy command, data to the at least one storage region according to the write command, and updating the first management information; and
- if the at least one storage region is included in the fourth storage area, writing, after copying data from the fourth storage area to the at least one storage region according to the second copy command, data to the at least one storage region according to the write command, and updating the first management information and the second management information, without copying data from the first storage area to the at least one storage region according to the first copy command.

8. The control method of a storage system according to claim 7, further comprising:
- a determination step of determining, upon executing a read command or a write command stored in the command queue, whether a copy command designating an area which partially or entirely overlaps with a read area or a write area designated in the read command or the write command as a copy source or a copy destination is stored in the copy queue; and
- a processing execution step of executing read processing or write processing according to the determination result.

9. The control method of a storage system according to claim 8,
- wherein the storage system comprises a hash table including a plurality of slots,
- wherein, at the determination step, upon receiving the copy command from the host device, a slot of the plurality of slots is associated with a copy source area or a copy destination area of the copy command according to a starting address of the copy source area or the copy destination area in the hash table, and the hash table is used to determine whether a copy command designating an area which partially or entirely overlaps with a read area or a write area designated in the read command or the write command as a copy source or a copy destination is stored in the copy queue.

10. The control method of a storage system according to claim 8,
- wherein, at the processing execution step, upon executing a read command stored in the command queue, if a copy command designating an area which partially or entirely overlaps with a read area designated in the read command as a copy destination is stored in the copy queue and copy to an area in which the read area and the copy destination area of the copy command overlap has not yet been executed, data is copied from a copy source area of the copy command to the overlapping area and data is thereafter read.

11. The control method of a storage system according to claim 8,
- wherein, at the processing execution step,
- upon executing a write command stored in the command queue, if a copy command designating an area which partially or entirely overlaps with a write area designated in the write command as a copy source is stored in the copy queue and copy to an area in which the write area and the copy source area of the copy command overlap has not yet been executed, data stored in the overlapping area is saved and write data is thereafter written.

12. The control method of a storage system according to claim 8,
- wherein, at the processing execution step,
- upon executing a write command stored in the command queue, if a copy command designating an area which partially or entirely overlaps with a write area designated in the write command as a copy destination is stored in the copy queue and copy to an area in which the write area and the copy destination area of the copy command overlap has not yet been executed, data stored in a copy source area of the copy command is copied to the overlapping area and write data is thereafter written.

* * * * *